(12) United States Patent
MacIntyre et al.

(10) Patent No.: US 8,719,071 B2
(45) Date of Patent: May 6, 2014

(54) SYSTEM, METHOD AND COMPUTER PROGRAM PRODUCT FOR PROCESSING AND VISUALIZATION OF INFORMATION

(75) Inventors: James W. MacIntyre, Leesburg, VA (US); David Scherer, McLean, VA (US); David Alan Rosenthal, Reston, VA (US)

(73) Assignee: Adobe Systems Incorporated, San Jose, CA (US)

( * ) Notice: Subject to any disclaimer, the term of this patent is extended or adjusted under 35 U.S.C. 154(b) by 1234 days.

(21) Appl. No.: 12/010,811

(22) Filed: Jan. 30, 2008

(65) Prior Publication Data

US 2008/0275744 A1 Nov. 6, 2008

Related U.S. Application Data

(62) Division of application No. 10/269,050, filed on Oct. 11, 2002.

(60) Provisional application No. 60/328,107, filed on Oct. 11, 2001.

(51) Int. Cl.
*G06Q 10/00* (2012.01)
*G06Q 30/02* (2012.01)

(52) U.S. Cl.
USPC .............. 705/7.29; 705/1.1; 705/7.11

(58) Field of Classification Search
CPC ................ G06Q 10/00; G06Q 30/02
USPC ......................... 705/1.1, 7.11, 7.29
See application file for complete search history.

(56) References Cited

U.S. PATENT DOCUMENTS

| | | | |
|---|---|---|---|
| 5,767,854 A * | 6/1998 | Anwar | 715/848 |
| 5,973,693 A * | 10/1999 | Light | 715/835 |
| 6,035,324 A | 3/2000 | Chang et al. | |
| 6,070,184 A | 5/2000 | Blount et al. | |
| 6,243,105 B1 | 6/2001 | Hoyer et al. | |
| 6,513,019 B2 | 1/2003 | Lewis | |
| 6,601,062 B1 * | 7/2003 | Deshpande et al. | 1/1 |
| 6,819,793 B1 | 11/2004 | Reshetov | |

(Continued)

FOREIGN PATENT DOCUMENTS

WO    WO 00/77682 A1    12/2000

OTHER PUBLICATIONS

Mohraz, Karim—Association for Computing Machinery: "Geographical Analysis in SAP Business Information Warehouse", ACM-GIS 2000. Proceedings of the 8th ACM Information Systems, Washington, D.C., Nov. 10-11, 2000, ACM International Symposium on Advances in Geographical Information Systems, New York, NY: ACM, US, vol. CONF. 8, Nov. 1, 2000, pp. 191-193, XP000987771.

(Continued)

*Primary Examiner* — Thomas L Mansfield, Jr.
(74) *Attorney, Agent, or Firm* — Kilpatrick Townsend & Stockton LLP

(57) ABSTRACT

Systems and methods for processing and reporting information and data, such as business information, and more particularly, to systems, software, hardware, products, and processes for use by businesses, individuals and other organizations to collect, process, distribute, analyze and visualize information, including, but not limited to, business intelligence, data visualization, data warehousing, and data mining. Real-time monitoring of web site interactions allows users to modify and fine-tune their websites to maximize value realized.

20 Claims, 25 Drawing Sheets

(56) References Cited

U.S. PATENT DOCUMENTS

| | | | |
|---|---|---|---|
| 2001/0018694 A1 | 8/2001 | Iwamoto et al. | |
| 2002/0029207 A1* | 3/2002 | Bakalash et al. | 707/1 |
| 2002/0067360 A1 | 6/2002 | Chi et al. | |
| 2002/0070953 A1* | 6/2002 | Barg et al. | 345/700 |
| 2002/0087443 A1 | 7/2002 | Williams et al. | |
| 2002/0133392 A1 | 9/2002 | Angel | |
| 2002/0143783 A1* | 10/2002 | Bakalash et al. | 707/100 |
| 2003/0014322 A1 | 1/2003 | Kreidler et al. | |
| 2004/0039804 A1 | 2/2004 | Carr et al. | |
| 2004/0064351 A1 | 4/2004 | Mikurak | |
| 2004/0163044 A1 | 8/2004 | Nakano | |
| 2004/0174397 A1 | 9/2004 | Cereghini et al. | |
| 2006/0116981 A1 | 6/2006 | Krimmel et al. | |

OTHER PUBLICATIONS

European Patent Application No. 02 801 006.4-1238 Office Action mailed Apr. 24, 2006, 7 pages.

Non-Final Office Action in related U.S. Appl. No. 10/269,050 dated Mar. 26, 2013, 13 pages.

Non-Final Office Action in related U.S. Appl. No. 12/010,812 dated Jun. 19, 2013, 21 pages.

Office Action from U.S. Appl. No. 12/010,810 mailed Mar. 15, 2011, 13 pages.

Office Action from U.S. Appl. No. 12/010,812 mailed Mar. 17, 2011, 13 pages.

U.S. Appl. No. 11/701,289, filed Jan. 31, 2007.

U.S. Appl. No. 11/701,041, filed Jan. 31, 2007.

Chen, et al., "Visualizing and Discovering Web Navigational Patterns," In Proceedings of the 7th International Workshop on the Web and Databases: colocated with ACM SIGMOD/PODS 2004 [online], published Jun. 17, 2004, vol. 67, p. 13-18.

U.S. Appl. No. 10/269,050, filed Oct. 11, 2002.

U.S. Appl. No. 12/010,810, filed Jan. 30, 2008.

U.S. Appl. No. 12/010,812, filed Jan. 30, 2008.

Ansari, et al., "Integrating E-Commerce and Data Mining: Architecture and Challenges," 2001 IEEE International Conference on Data Mining, 8 pages.

Andritsos, et al., "Reverse Engineering Meets Data Analysis," IEEE, 0-7695-1131-7/01, 2001, 10 pages.

* cited by examiner

Different Potential Configurations

SYSTEM, METHOD AND COMPUTER PROGRAM PRODUCT FOR PROCESSING AND VISUALIZATION OF INFORMATION

CROSS REFERENCE TO RELATED APPLICATIONS

The present application is a divisional of U.S. patent application Ser. No. 10/269,050, filed on Oct. 11, 2002, and claims the benefit of U.S. Provisional Patent Application No. 60/328,107, filed on Oct. 11, 2001, the entire disclosures of which are incorporated herein by reference.

COPYRIGHT NOTIFICATION

Portions of this patent application contain materials that are subject to copyright protection. The copyright owner has no objection to the facsimile reproduction by anyone of the patent document, or the patent disclosure, as it appears in the Patent and Trademark Office, but otherwise reserves all copyright rights.

COMPUTER PROGRAM LISTING APPENDIX

A computer program listing appendix is included with this application and the entire contents of the computer program listing appendix is incorporated herein by reference. The computer program listing appendix is stored on two sets of identical compact discs, each set of discs comprising one compact disc, containing the files identified in Appendix I. The computer program listing and the files contained on the compact discs are subject to copyright protection and any use thereof, other than as part of the reproduction of the patent document or the patent disclosure, is strictly prohibited.

BACKGROUND OF THE INVENTION

1. Field of the Invention

The present invention relates, generally, to systems and methods for processing and reporting information and data, such as business information, and more particularly, to systems, software, hardware, products, and processes for use by businesses, individuals and other organizations to collect, process, distribute, analyze and visualize information, including, but not limited to, business intelligence, data visualization, data warehousing, and data mining.

2. Discussion of the Background

Business analytics is focused on deriving actionable intelligence from transactional or other process automation systems, content distribution systems, and databases. The proliferation in the use of such transactional and other process automation and content delivery systems has created a substantial need for efficient and effective analytical systems. The Internet has emerged as a global medium that allows millions of users to more efficiently obtain information, communicate, and conduct business. As Internet usage has grown, companies have increasingly come to rely on Web-based systems, Internet and intranet sites as important business channels.

Through the Internet, a company can establish and maintain large numbers of direct relationships and reduce costs in traditional infrastructures such as retail outlets, distribution networks, and sales personnel. Both traditional and Web-based companies use the Internet to communicate marketing and other important information to customers, and manage relationships with vendors, partners, and employees. Increasingly, companies are using the Internet to generate revenue through the sale of goods and services, as well as through the sale of advertising.

However, managing, evaluating, monitoring and optimizing online transactions, and providing for personalized customer relationships are highly complex processes. In part, as a consequence of the Internet technology gap between what works in theory and what works in practice, a crisis in web usability exists as evidenced by numerous research studies:
Forrester research revealed that:
  50% of potential online sales are lost when online users cannot find what they are looking for;
  40% of online users do not return to a site when their first visit resulted in a negative experience; and
  75% of all shopping carts are abandoned. Research by Jakob Nielsen shows that:
  Worldwide, the cost of poor intranet usability will grow to about $100 billion by the year 2001; and
  90% of commercial Web sites have poor usability.

This research data provides an objective view on the seriousness of the usability crisis. It is becoming increasingly clear to companies that their web-based systems are not as effective as they need to be, and that current analytical tools are not delivering the information required to address these problems.

Companies pay millions of dollars to operate their e-business web sites, yet have little or no direct visibility into their operations. Reporting systems for Enterprise Resource Planning (ERP) applications are woefully inadequate in giving business managers cogent information in time to make changes. Companies buy millions of dollars of software and services for business systems that they cannot monitor or optimize at a business level, and information is either not delivered to executives or it is delivered in a form that lacks continuity, interactivity, timeliness and transparency. For all of the dollars that have been spent on automating business systems, no one has been able to provide to the person who is paying for the systems an ability to interactively visualize or analyze the operations of the system and optimize return on their investment. These and other deficiencies divert millions, if not billions, of dollars from the bottom lines of companies worldwide.

Millions of web sites have been developed by businesses, however many of them are ineffective or sub-effective, and some are even damaging to their enterprises. Managers and executives have little visibility into the ongoing operations of their sites, regardless of their purpose. In many cases, millions of dollars have been spent to build these sites, many of which are intended to support business critical, if not mission critical, business processes, such as sales and distribution. Yet executives and managers do not have the tools to stay on top of their operations, let alone optimize them. In the best of cases, managers get reports once a week or once a month that give them a snapshot of their site's performance. Put plainly, the people with checkbooks, decision-making authority, financial experience and authority are locked out of the site optimization process, and are expected to act blindly with poor information, through other people.

With the advent of the Internet, companies, their customers, vendors, partners, distribution channels, and employees now have the means to more efficiently share information, automate business processes, and conduct business on a global scale. With the user/customer's ability to change providers at the click of a button, companies must find ways to differentiate their offerings and personalize their business transactions to meet customer needs. Additionally, companies must ensure that the user experience is satisfying and that their sites' design does not inhibit the user's desired outcome (purchasing, enrolling, retrieving information, etc.) or loyalty ratios will suffer, driving up customer acquisition costs. The bar for doing it right is rising each day.

With almost all web-based applications, business managers do not have the ability to react to market conditions with real-time control. Tools that provide managers with accessible and useful insights into their Internet/intranet processes are desperately needed. Real dollars are being spent, and the investments that they are supporting need to be managed and monitored with tools that make the automated systems and sites "real" to managers.

Business systems in general have suffered through lack of reporting facilities that are accessible, usable, and understandable to key managers and executives. This lack of visibility costs companies worldwide an incalculable amount of wasted expenditure and lost opportunity.

Human beings have an incredible facility for visual pattern recognition that far transcends their ability to glean the same patterns from data formatted in textual reports. When they are visually enabled, they can explore vast amounts of data, rapidly to identify patterns and opportunities that were previously unnoticed. Typical reports and periodic updates that pervade conventional decision support and executive information systems, however, are tabular, static and difficult to interpret.

More recently, On-Line Analytical Processing (OLAP) has become available as a tool for providing c-business analytics. OLAP is a category of software technology that enables analysts, managers and executives to gain insight into data through fast, consistent, interactive access to a wide variety of possible views of information that has been transformed from raw data to reflect the real dimensionality of the enterprise as understood by the user. OLAP functionality is characterized by dynamic multi-dimensional analysis of consolidated enterprise data supporting end user analytical and navigational activities including: calculations and modeling applied across dimensions, through hierarchies and/or across members; trend analysis over sequential time periods; slicing subsets for on-screen viewing; drill-down to deeper levels of consolidation; reach-through to underlying detail data; rotation to new dimensional comparisons in the viewing area. OLAP is typically implemented in a multi-user client/server mode and offers consistently rapid response to queries, regardless of database size and complexity. OLAP helps the user synthesize enterprise information through comparative, personalized viewing, as well as through analysis of historical and projected data in various "what-if" data model scenarios. Typically, OLAP is facilitated by an OLAP Server that processes the data for a client application that presents data and helps users define queries.

As noted above, OLAP enables a user to easily and selectively extract and view data from different points-of-view. For example, a user can request that data be analyzed to: (i) display a spreadsheet showing all of a company's beach ball products sold in Florida in the month of July; (ii) compare revenue figures with those for the same products in September; and then (iii) see a comparison of other product sales in Florida in the same time period. To facilitate this kind of analysis, OLAP data is typically stored in a multidimensional database. Whereas a relational database can be thought of as two-dimensional, a multidimensional database considers each data attribute (such as product, geographic sales region, and time period) as a separate "dimension." OLAP software can locate the intersection of dimensions (all products sold in the Eastern region above a certain price during a certain time period) and display them. Attributes such as time periods can be broken down into sub-attributes.

Notwithstanding the enhanced querying, calculation, and indexing functionality of OLAP systems, and their multidimensional access to data, such systems still lack the capability to efficiently and effectively measure, manage, evaluate, monitor, and optimize current transactional, process automation, content distribution, web-based type business systems. Presently available OLAP systems are incapable of providing the required business intelligence information in a form that is effectively usable and meaningful, and in a time frame that enables effective utilization of the information. Moreover, such systems do not have the capability to interactively visualize or analyze the business information and data collected, and to process, distribute, analyze, and visualize such business information in real-time.

Consequently, there is a need for a business analytics system that is capable of interactive visualization and analysis of business information and data, that can collect, process, distribute, analyze, and visualize such business information and data in real-time. There is a need for such a system that is capable of providing reports that are visual, interactive, and easy to understand, thereby taking advantage of human beings' natural ability for visual pattern recognition. There is a need for providing actionable intelligence from transactional or other process automation systems, content distribution systems and databases. More specifically, there is a need to allow users to visually explore vast amounts of data in real-time by pointing and clicking to make queries, and to select data in, and present it through, multi-dimensional graphical representations. In addition, there is a need to provide actionable intelligence to a user to allow the user to 1) evaluate the usability of the site; 2) assess modifications to the site; 3) improve conversion rates; 4) improve site performance; 5) improve customer satisfaction; 6) optimize marketing campaigns; 7) reduce customer session loss; and 8) forecast the potential return on a campaign or site change and prioritize investments.

SUMMARY OF THE INVENTION

The primary object of the present invention is to overcome the deficiencies of the prior art described above by providing a system, method, and computer program product for processing and visualizing information, which is capable of interactive visualization and analysis of information and data, that can collect, process, distribute, analyze, and visualize such information and data, such as business information, in real-time.

Another key object of the present invention is to provide a system, method, and computer program product for processing and visualization of information, which can provide actionable intelligence from transactional or other process automation systems, content distribution systems, and databases, thereby optimizing the usability and performance of such systems, including Internet and intranet applications, and providing enhanced utility to end-users and more profits for businesses.

Another key object of the present invention is to provide a system, method, and computer program product that can assist in the analysis and optimization of e-business processes, such as marketing, sales, content delivery, customer service, purchasing and others.

Yet another key object of the present invention is to provide a system, method, and computer program product enabling the measurement, monitoring, exploration, evaluation, and optimization of critical business systems, assets, and investments A key object of the present invention is to provide a system, method, and computer program product that allows users' to monitor, analyze, control and optimize their investments in customer relationships, marketing campaigns, operational systems, and automated business processes.

Another key object of the present invention is to provide a system, method, and computer program that facilitates improved process conversion rates including: retail sales transactions, content distribution, purchasing, shopping, customer service, registration, application, status checking, research, and others.

Yet another key object of the present invention is to provide a system, method, and computer program product that can take advantage of scientific processes, such as enabling controlled experimentation with users' interactive systems and marketing campaigns.

Another key object of the present invention is to provide a system, method, and computer program product that provides visibility into automated business processes, historically and in real-time.

Yet another object of the present invention is to provide a system, method, and computer program product that provides accountability by tracking objectives verses actual results on an ongoing basis.

Another object of the present invention is to provide a system, method, and computer program that provides enhanced customer and market knowledge and insight, thereby enabling higher average sales per customer, reduced customer session loss, and the ability to personalize customer interaction based on facts, not guesswork.

Yet another object of the present invention is to provide a system, method, and computer program product that enables the optimization of site and marketing campaign results, and increased yield from marketing and advertising campaign spending.

Another object of the present invention is to provide a system, method, and computer program product that facilitates increased enrollment, registration and data collection rates.

Yet another object of the present invention is to provide a system, method, and computer program product that enables improved site performance (improved navigation, reduced load, increased loading speed, etc.), resulting in lower infrastructure expenses.

Another object of the present invention is to provide a system, method, and computer program product that provides for processing and visualization of business information, thereby facilitating improved customer satisfaction, resulting in increased site loyalty, greater visitation frequency, larger percentage of repeat visitors, reduced customer acquisition costs, and longer user sessions.

Yet another object of the present invention is to provide a system, method, and computer program product that provides an ability to forecast the potential return on a campaign or site change, and to prioritize investments.

Another object of the present invention is to provide a system, method, and computer program product that provides reduced customer support expenses and reduced off-line sales and support expenses.

Still another object of the present invention is to provide a system, method, and computer program product that more efficiently utilizes customer information to provide actionable intelligence to the user.

Another object of the present invention is to provide a system, method, and computer program product that reduces the amount of data that needs to be transmitted to the client application.

Yet another object of the present invention is to provide a system, method, and computer program product that performs statistical sampling in order to permit processing of a large amount of data in an extremely short period of time.

Still another object of the present invention is to provide a system, method, and computer program product that is fault-tolerant, highly scalable, extensible, and flexible.

Another object of the present invention is to provide a system, method, and computer program product that provides more comprehensive, higher quality information to business people so that they can make better business decisions faster and more effectively, while requiring less manual effort and company expense.

Still another object of the present invention is to provide a system, method, and computer program product that provides highly graphical, point-and-click interactive access to vast amounts of data, at very high access speeds, providing the needed information in a way that can be quickly and visually understood.

Yet another object of the present invention is to provide a system, method, and computer program product that permits users, in real-time, to actively analyze vast amounts of business information in task oriented workspaces, or to passively monitor performance through dashboard views alone or in collaboration with their teams.

The present invention achieves these objects and others by providing a system, method, and computer program product for processing and visualization of information comprising a Visual On-Line Analytical Processing (VOLAP) Platform comprising one or more Visual Workstations, a Visual Server, and one or more Visual Sensors.

The Visual Sensor is a processing module that communicates with, and may execute on the same computer system as, an automated processing system, such as a web server. The Visual Sensor collects information and data, such as information and data relating to customers, marketing campaigns, operational systems, and/or automated business processes from the automated processing system. The collected data is stored in a queue, referred to as the Visual Sensor queue, which communicates with the automated processing system.

The Visual Server retrieves the collected data from the Visual Sensor queue and processes that data, which may include statistical sampling, for use by the Visual Workstation. The Visual Server stores the information indefinitely and continually updates the Visual Workstations with the newly processed data.

The Visual Workstation executes client specific applications and provides an interface for performing administrative functions to the system. The Visual Workstation includes high-speed graphics capabilities for fast multi-dimensional graphic presentations of e-business analytics to the user. In addition, the Visual Workstation provides a user interface for manipulating data, performing queries, and otherwise interacting with the resident application. The Visual Workstation provides a complete application framework by supporting multiple types of visualization, the organization of visualizations into workspaces and dashboards, and the ability to collaborate with other users of Visual Workstation.

A client application module is the means by which data is processed for presentation to the user on the Visual Workstation. The client application interfaces with the VOLAP platform and, more specifically, the information and data processed by the VOLAP platform, through its implementation on the Visual Workstation. The client application may process sample data or unsampled data depending on the amount of information collected. The processed data is then presented to the user through the Visual Workstation.

The system, method, and computer program product of the present invention takes advantage of the user's inherent pattern recognition capacity, allowing his or her mind to quickly identify trends, changes, opportunities, correlations, and problems through the use of the advanced visualization techniques and real-time online analytical processing enabled by the present invention.

The present invention extends and modifies the typical definition of OLAP in the following ways, amongst others:
1. queries are executed in milliseconds, rather than in seconds, minutes or hours;
2. enables metrics and dimensions to be constantly updated on the user's visual desktop as the fact data changes, in real-time, due to ongoing data collection;
3. does not create aggregations or "cubes" from fact data as a pre-processing step required before users are able to query the data. The present invention is capable of building multi-dimensional arrays and other data structures on the fly, from the fact data in the database, in milliseconds, for interactive drilling and slicing, as required;
4. permits users to define selections or queries through interacting with visualizations that depicts metrics and data dimensions;
5. does not require that the client application be connected to a back-end OLAP server for a user to use the application; and
6. provides a robust interactive, multi-dimensional visualization interface that is intuitive and easy for users to explore data.

Multi-dimensional graphical displays require more data to be accessed from data subsystems or databases than do the other reporting displays, and even today's best OLAP, decision support and business intelligence software products produce such reports in seconds or minutes. The present invention provides the data in milliseconds so that the user can enjoy a graphical display that is responsive and capable of interactively animating business intelligence information. In addition, this data can be interactively displayed in a myriad of visual manners that assist users in recognizing important business patterns, problems, opportunities and trends.

The present invention has the ability to take advantage of scientific processes, such as enabling controlled experimentation with users' interactive systems and marketing campaigns. Users' can form a hypothesis about how a marketing campaign and internet site may be changed, test market the hypothetical change on a subset of potential visitors and actual visitors, study the results, and either iterate further with another test, or roll the campaign out to a broader market to capture the benefits proven likely in the market test.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
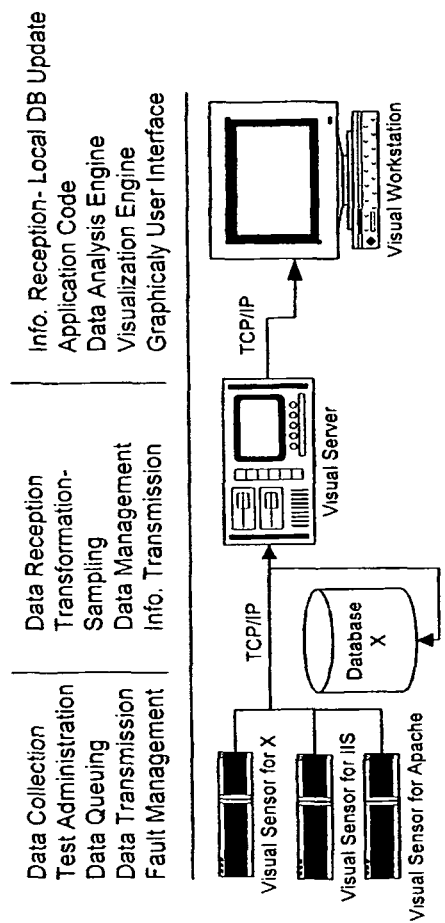
FIG. 1 is a functional block diagram of the architecture for a system for processing and visualization of information according to the present invention.

In the following description, for purposes of explanation and not limitation, specific details are set forth, such as particular networks, communication systems, computers, terminals, devices, components, techniques, data and network protocols, sampling techniques, communication protocols, storage techniques, software products and systems, enterprise applications, operating systems, enterprise technologies, middleware, development interfaces, hardware, etc. in order to provide a thorough understanding of the present invention. However, it will be apparent to one skilled in the art that the present invention may be practiced in other embodiments that depart from these specific details. Detailed descriptions of well-known networks, communication systems, computers, terminals, devices, components, techniques, data and network protocols, sampling techniques, communication protocols, storage techniques, software products and systems, enterprise applications, operating systems, enterprise technologies, middleware, development interfaces, and hardware are omitted so as not to obscure the description of the present invention.

I. General Design Concepts

A. Conversion

Many sites have been built and made accessible on the Internet and through intranets to allow customers or end-users to interact with companies. At a high-level, a business process is any set of pages in a site with a first and a last page, where if users complete the process, they have established some type of value for the company, such as making a purchase, registering for a promotion, applying for a loan, etc. Customer self-service decreases the costs of alternative business processes, such as call center processing, and drives revenue through sales, referrals, advertising and other mechanisms. The tasks that the customers or end-users can complete at a site vary dramatically by the type of business implementing the site and its processes, as illustrated by the following two examples.

A retail bank implements customer self-service business processes for, amongst other purposes: reviewing financial product offers, taking consumer applications for accounts, allowing the consumer to access credit card account information, mortgage applications, comparing rates and terms, etc.

An e-commerce site implements customer self-service business processes that allow consumers or business representatives to shop for products, configure orders, enter orders, check order statuses, register, login, get customer support, make payments, participate in promotions, etc.

In each case the customer begins a process when they have made clear that they wish to complete a given task by selecting a specific URL served by the site. The completion of that task, such as completing a payment, or registering as a new customer, is a "value event" for the site owner and the fulfillment of the site owner's objective in building the business process and presenting it to customers. There may be many steps, pages and forms presented to the customer in an Internet business process before the process is complete and the site receives value. Alternately, completion of process may require accessing only a single page. A "process conversion rate" is the rate at which a certain customer or type of customer completes a business process that produces a value event after they have expressed an initial interest in completing the business process or task. The higher the process conversion rates get, the more profitable the process will be, and the higher the return on the company's investment in building it and operating will get. The present invention assists in improving process conversion rates.

B. Metric

A metric is a numerical value set representing and relating a measurement or a derived and calculated measurement. For instance, the present invention can monitor the following metrics amongst others:

1. Visits—These are the measurements and calculations derived from the web server's data about when a user comes to the site, how long they stay and when they leave;
2. Value Events—This is a calculated metric that is derived from visits and simple user input that delineates when a visitor has done something that created value for the site;
3. Conversion—This is a calculated metric that depicts a measurement of the rate at which visits result in value events;
4. Return—This is a calculated metric that depicts the financial return of a particular value event;
5. Other Metrics—There are numerous other metrics that are both directly based on external measurements and in other cases calculated based on those metrics and user input through the client application;

6. Custom Metrics—Users of the present invention can create certain types of custom metrics to depict important information particular to their business; and
7. Temporary Metrics—Additionally, temporary metrics are created and play a part of certain types of analysis tasks.

C. Data Dimension

A dimension is a structural attribute of a data analysis system that is a list of members, all of which are of a similar type in the user's perception of the data. For example, all months, quarters, years, etc., make up a time dimension; likewise all cities, regions, countries, etc., make up a geography dimension. A dimension acts as an index for identifying values within a dimensional array. If one member of the dimension is selected, then the remaining dimensions in which a range of members (or all members) are selected defines a sub-dimension. If all but two dimensions have a single member selected, the remaining two dimensions define a spreadsheet (or a "slice" or a "page"). If all dimensions have a single member selected, then a single cell is defined. Dimensions offer a very concise, intuitive way of organizing and selecting data for retrieval, exploration and analysis. Some examples of data dimensions that are available in one example client application (Visual Site) and used to visualize metrics include, amongst others:

1. Clicks—These are the instances of visitors selecting URLs during their visits to view pages.
2. Referrers—This is the dimension of instances of referral of a visitor visiting.
3. Zip Code—This is the dimension of zip codes of visitors.
4. Page—This is the dimension of pages that any visitors may have selected in their visits.
5. Custom Dimensions—Users may create certain types of custom data dimensions to depict important information particular to their business; and
6. Temporary Dimensions—In some cases temporary dimensions may be created as a part of a certain types of analysis tasks.

In addition, there are numerous other data dimensions that are either continuously managed by the VOLAP platform or are created in the process of data display and analysis.

D. Selection, Filter or Query

The terms selection, filter or query are generally used interchangeably. A selection, filter or query defines the search terms and conditions used by Visual Workstation to go to the database and retrieve data as defined by that selection, filter or query and present it to the user.

E. Visualization

A well-done visualization is a graphical representation of data that allows a person to more rapidly and completely understand patterns that exist in data as well as compare the relative magnitudes of data values versus their peers. There are many types of visualizations:

1. One-Dimensional Graphs and Histograms—One dimensional (1D) graphs depict a metric (e.g., a business metric) over one data dimension such as time. A histogram groups data values into buckets along that dimension such as by week, or Mondays.
2. Two-Dimensional Graphs and Histograms—Two dimensional (2D) graphs depict one or two metrics over two data dimensions. For instance visitors to a site and their conversion rates to purchase as the metrics over the dimensions day of the week and hour of the day.
3. Multi-Dimensional Graphs and Histograms—Multi-dimensional (MD) graphs depict multiple metrics over multiple data dimensions. For instance visits, conversion rate, and benchmark visits over the dimensions hour of the day, day of the week, referrer, campaign, etc.

II. Structure and Architecture of System and Modules/Components

Figure 2:
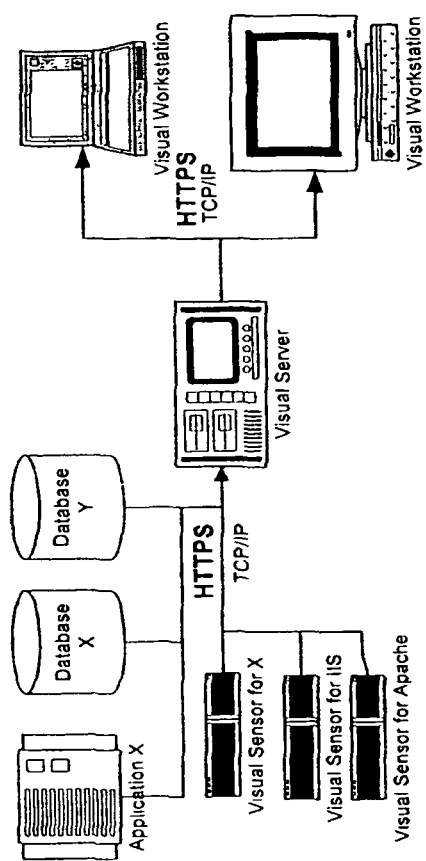
FIG. 2 is a more detailed functional block diagram functional of the architecture for a system for processing and visualization of information according to the present invention.
Figure 3:
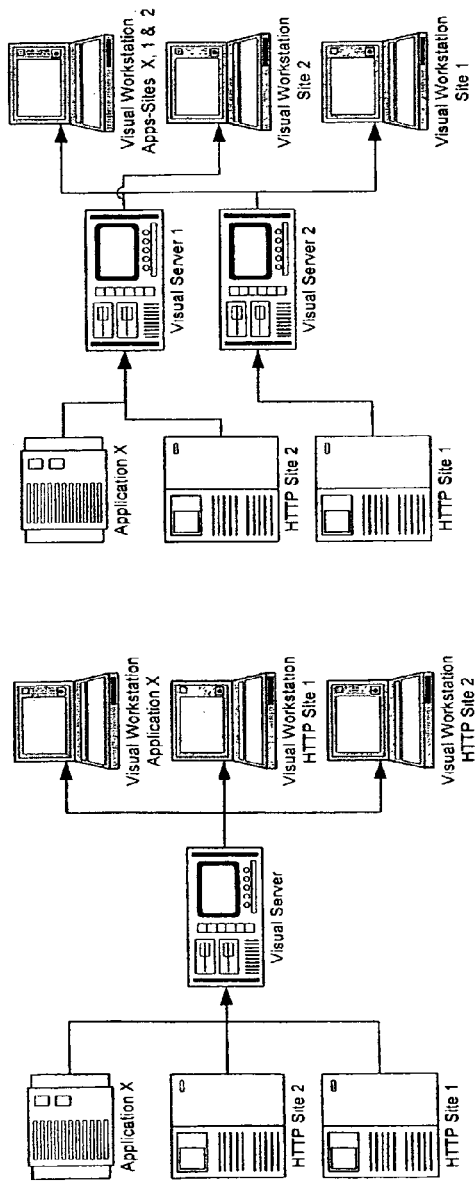
FIG. 3 is a functional block diagram of the architecture for a system for processing and visualization of information of FIG. 1 showing examples of different configurations of the system.
Figure 3:
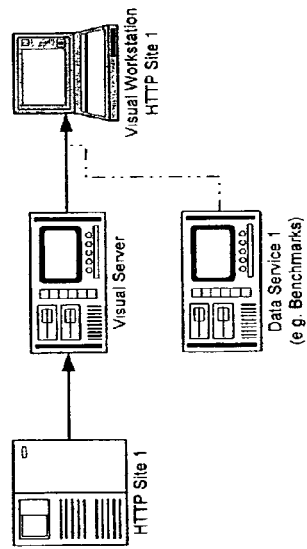
Figure 4:
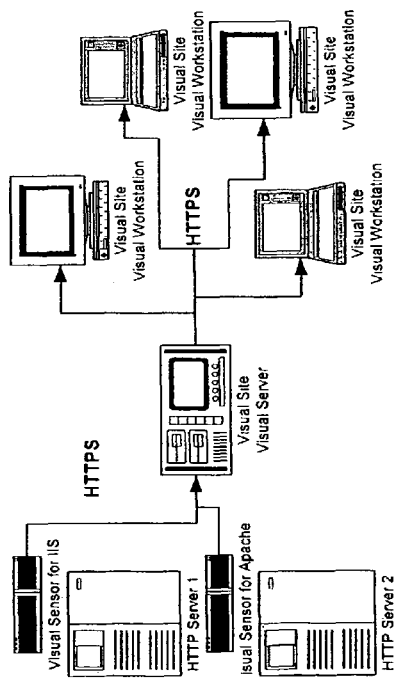
FIG. 4 is a functional block diagram of the architecture for a system for processing and visualization of information of FIG. 1 showing an example of the system implemented with the Visual Site application.
Figure 4:
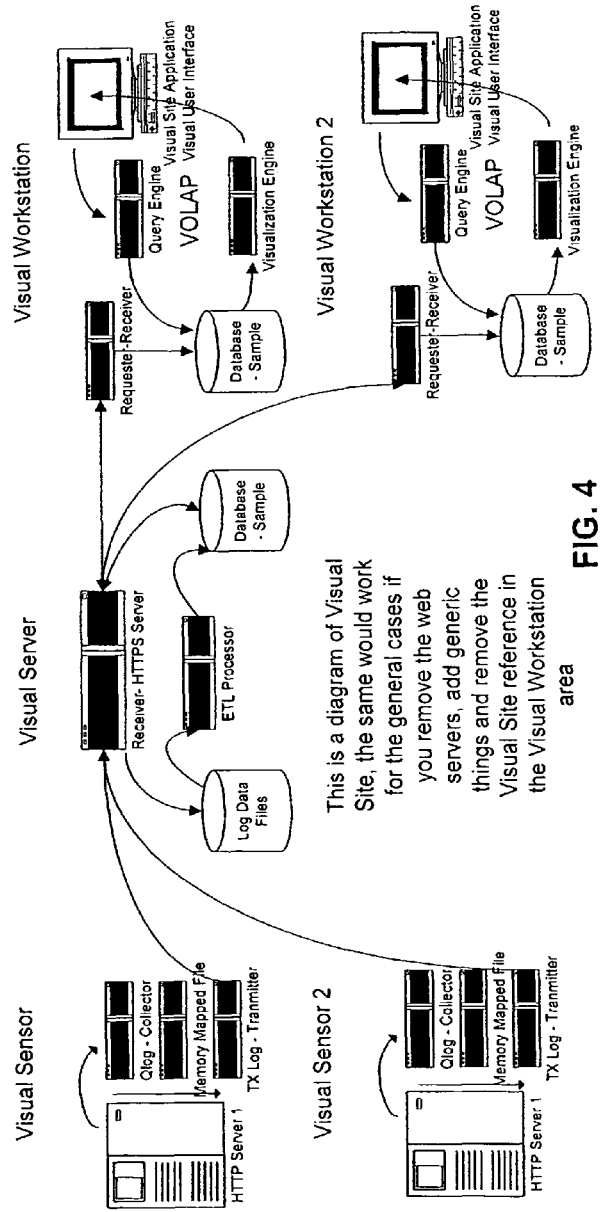

As shown in FIGS. 1-4, the VOLAP Platform includes at least one Visual Sensor component 101a-101c, a Visual Server 103 and at least one Visual Workstation 105, 201. Together they provide the underpinning technology platform required for VOLAP applications. The VOLAP Platform enables VOLAP applications that can be built to support different data domains, business needs and user requirements. The VOLAP application which is described as an example application herein is referred to as Visual Site, which is built for the owners and operators of Internet business sites. However, as will be evident to those skilled in the art, other applications for other automated processes may be designed to run on the VOLAP Platform as well. The software modules and components of the example embodiment of the present invention are written in C++, although any suitable language could be used.

The Visual Workstation is a desktop application that provides its users with a robust desktop operating environment that enables very fast multi-dimensional data analysis, robust data visualization, and an interactive method of defining queries of the fact data. Visual Workstation provides a complete application framework by supporting multiple types of visualization, the organization of visualizations into workspaces and dashboards, and the ability to collaborate with other users of Visual Workstation. Visual Workstation obtains data from the Visual Server and provides the operating environment for the application (e.g., Visual Site) and can be implemented on a desktop or notebook computer, or other suitable device.

The Visual Server is a real-time data integration and processing server that collects data from remote systems and databases, manages that data, transforms that data into a form that can be used by Visual Workstations, and manages the distribution of that data to Visual Workstations. The Visual Server can be configured to make requests of external systems to get data that can be integrated for analysis purposes. Visual Server is designed to require minimal maintenance and can be peered with other servers and data collection products to get data prepared for users of Visual Workstation. The Visual Server may operate on a stand-alone computer, or may share a computer with other applications.

The Visual Sensor is the measurement, collection and transmission software application. Visual Sensor is capable of interacting with its host (e.g., a web server) and is able to collect data, filter unnecessary data, queue the data for transmission, and ensure that the data is delivered to Visual Server. Visual Sensor may be customized for different systems. The Visual Sensors described in the example embodiments herein operate with Microsoft's Internet Information Server or Apache's Web Server. The Visual Sensor is resident on the web server computer in the embodiments described herein. As will be apparent to those skilled in the art, the Visual Sensor may be implemented on a computer other than the web server computer or computer on which the automated processing system is running, and may be adapted to operate with servers other than Microsoft's Internet Information Server and Apache's Web Server.

A VOLAP application is an application that uses the VOLAP Platform to provide certain business value to a certain type of company with certain needs. For instance, Visual Site, an example of a client application for the VOLAP platform, is built to provide business value to owners and operators of internet properties that automate certain business processes, marketing efforts and interact with the company's customers. The Visual Site application satisfies the following, amongst other user needs: 1) gaining visibility into the dynamics of their electronic business that is difficult to monitor today; 2) improve the profitability of marketing campaigns; 3) improve the return on investment in infrastructure systems; 4) improve the experience of customer relationships and monetize their value to the company.

A. Visual Sensor

The Visual Sensor gathers the desired information and data directly from the automated business processing system (e.g., the web server software in this embodiment). The data is then queued up for transmission to a Visual Server that is addressable on the network. The transmission channel, which uses the http protocol, is encrypted with SSL to protect the data from being intercepted. A Visual Sensor is installed on each web server that is a part of the same site and directed to send the collected data to the same Visual Server. Visual Sensor requires little or no oversight, unless configuration changes are made to the web server or network.

As discussed, each Visual Sensor captures data from the web server software and then writes it into a memory mapped file on the web server that serves as a storage queue for the periodic instances when Visual Sensor cannot contact Visual Server.

The data that is collected in the storage queue is forwarded to the Visual Server as fast as network conditions will allow. The connection to Visual Server is made to its port 443, the same as a standard web server using HTTPS. The connection is encrypted using SSL to ensure that the data is protected en route to the Visual Server. The Visual Server receives the data and begins its processing and storage tasks. If the connection between Visual Sensors and Visual Server is broken for some external reason, Visual Sensor will queue up all data from the web server and transmit it when the connection is reinstated. The time that this information can be queued is based on the activity of the web server, but is usually 1 to 10 days. If the connection to Visual Server is not restored before the queuing disk space that is allocated on the web server is used up, data will be lost.

In the present example embodiment, the Visual Sensor is designed to support a web server (HTTP) data source. However, the Visual Sensor can be designed to support other types of data sources (other than HTTP) and transmit the data it collects and measurements it takes to Visual Server for processing and further transmission to Visual Workstation.

Visual Sensor is capable of additional services in addition to collecting and forwarding log data. For example, the Visual Sensor may take on additional system roles such as rewriting URLs or implementing an experiment on the HTTP server as is discussed below in detail.

The Visual Sensor can be configured to log HTTP traffic from an IIS or Apache server without performance impact on the server. In addition, a Visual Sensor API provides a standard for the creation of Visual Sensors for other systems.

The Visual Sensor software uses minimal resources of the web server. Under normal conditions the amount of processor power that is used is extremely difficult to measure. If the connection to Visual Server is for some reason severed, Visual Sensor will begin using its allotted data storage on the web server to prevent data loss. This queue size can be set from 1 MB to multiple GBs. Each visitor "click" requires approximately 300 bytes of storage space. For a server that receives 1,000,000 clicks in a day, the queue size would reach 300 MB in a day. In the case that a queue fills up with megabytes of data and the connection to Visual Server is then restored, Visual Sensor will as rapidly as possible transmit the queued data to Visual Server. In this "burst" mode Visual Sensor could take as much as 5% of the web server's processor power, which is generally insignificant as there is typically well more than 5% of excess processor power available from web server hardware.

In the present embodiment, the Visual Sensors are configured during installation.

B. Visual Server

The Visual Server is installed on the user's network and collects data from the Visual Sensors. After receiving the data, the Visual Server does the following with the data:
1. integrates the data from each of the Visual Sensors;
2. stores a copy of the data to disk in a compressed file format that can be re-read or used by other applications;
3. runs its transformation and data integration algorithms on the data that is collected;
4. transmits the transformed data to any authorized and available Visual Workstations; and
5. maintains a database of the transformed data in order that it can be re-transmitted to a Visual Workstation or transmitted to a new Visual Workstation.

The Visual Server application may be installed on any suitable computer system. The table below provides examples of two computer systems that are suitable for running the Visual Server application.

| Vendor | Dell | IBM |
|---|---|---|
| Model | Poweredge 2550, 2500SC | |
| U Factor | Tower/2 U | 2 U |
| Processor | >=1 Ghz | >=1 Ghz |
| Screen | 15" RGB LCD | 15" RGB LCD |
| Random Access Memory | 512 MB | 512 MB |
| Hard Disk Drive | 80 GB | 80 GB |
| Graphics Card | | |
| USB Ports | 2 | 2 |
| Ethernet Ports (100BaseT) | 1 | 1 |
| CD-ROM | | |
| Tape Back-up | | |
| DVD-ROM | | |
| Screen Resolution | | |
| Floppy Disk Drive | 1.44 | 1.44 |
| Link to Product Lit. | | |
| Pointing Device | Microsoft Optical | Microsoft Optical |
| Operating System | Windows 2000 Pro | Windows 2000 Pro |
| Microsoft Excel | Excel 2000 | Excel 2000 |

Visual Server receives data from all Visual Sensors, combines it with other external data, processes it, and transmits it to Visual Workstations. Multiple Visual Sensors may provide data to one Visual Server. Visual Server then processes the data coming from all of those servers. In the present example embodiment, there is preferably one Visual Server for each Web site. There may be many Visual Sensors, as each Web site may have multiple Web servers.

The Visual Server includes a Server Receiver (HTTPS Server) and a Processing Server. The Server Receiver provides communications with the Visual Sensors and also serves the purpose of processing requests from Visual Workstations.

The data collected by Visual Sensor is stored by Visual Server by date in compressed form, and can be exported to common log formats for use by other applications. In addition, Visual Server takes the stream of incoming log data and additionally processes it for use by a client application, such as Visual Site. This processing includes many types of processing, such as sessionizing the data, parsing URLs, and others.

In general, when a click gets added to the sample database by the Visual Server, some analysis or processing is performed. Information like whether this click starts a new session, or is part of an existing one, the duration of the click prior to this one (if any), and total session duration can be calculated. Furthermore, relevant dimensions are built up, such as target URL or Referrer. A dimension is a single vector of data points, into which a click or session has a reference. Clicks are inserted into the sample database by generating transactions.

The data is then organized into the data structure that supports Visual Workstation and the client application, and allows multi-dimensional analysis. The database that is created and updated by Visual Server is a custom relational database structure. The database resides in server memory with a persistent backup to disk in the form of a file, the current state of the Processing Server, and a transaction log of all transactions that have been generated to date for the database. The database is optimized for performance by allowing columns to be scanned very rapidly by indexing the actual location and order of the data in relation to the rest of the column of data.

The database has tables that have columns and rows. There is no hard binding between the tables. The order of the row in the column is the identifier of the position of the data in that column. In the present example embodiment, the database has the following tables for storing the following information:

Referrers
  Pages
  Clicks
  Sessions
  Visitors
  Visitor Sessions
  Zip Codes
  Time Ranges
  User Agents Additional Dimensions add additional tables or columns.

At the top level, the database has the above tables. Each table defines the columns (fields) that are in it. The Sessions table has a click index column which points into the Clicks table identifying where the clicks from this session start, and has a click count to indicate how many of the next rows contain clicks from that session.

The Session tables have the following additional fields:
  A VisitorID which has a reference to the row in the visitor table;
  The timestamp for the session start;
  A pointer to the appropriate row in the referrer dimension;
  A duration column that gives the length of the session;
  A pointer to the appropriate row in the zip code dimension;
  A pointer to the appropriate row in the user agent dimension; and
  A field that is used to store intermittently produced value projections on the client. (The 'value model' in Visual Workstation computes a dollar value for each session based on the pages visited in the session and processes used by other sources when supporting other applications. This value is stored back into a column in the database for fast access.)

The Click table has a special allocator for performance reasons. It allocates memory for storage of clicks to improve resource usage and performance. It stores a list of free blocks inside its free blocks and assigns blocks based on order natural log(n). The Click table has references to the page dimension and the duration of the click. References exist as pointers to the row of the page dimension column.

One primary difference between this and a relational database is that relationships are built based on the allocation of space and position of the referenced element in the columns and, in the some cases, groups sets of clicks, for instance, keeping them in order so that you can start scanning at one point and just take the next N rows and know that you have the right data.

A statistical sample of the data is taken that represents the larger data set. This sample allows users to look at very large amount of data without transmitting all of the data to the Visual Workstation as is described in more detail below. Fact data that is left out of the sample can be retrieved from Visual Server at a later time if it is requested by a user. Fact data is the log data collected by Visual Sensor, provided to the Visual Server, processed and sampled to create the sample database. In the present example embodiment, the fact data would include all the information relating to particular sessions, users, and clicks, URL requests, etc., while the sample database would include a random sample of the fact data.

The Visual Server includes fault tolerant data queuing. Data is transmitted from collection points (e.g., Visual Sensors) across the Internet to Visual Server for combination, processing and distribution to Visual Workstations. The Visual Server queuing system can support system and network downtime without losing data. If a Visual Workstation or Visual Sensor is temporarily disconnected from the Visual Server, the Visual Server will resume transmitting (or retrieving in the case of Visual Sensor) once the connection is reestablished.

In addition, the Visual Server provides real-time data throughput including individual measurements, which become available to Visual Workstations while a customer session is still in progress. The Visual Server provides automatic updates to the Visual Workstations when connected to the network and no external database servers are needed to support Visual Workstation. The Visual Server scales to any size site with a single server.

Complete detailed records of collected data are compressed and stored indefinitely for future use. Visual Server's data store may be backed up through the use of a third-party secured and automated backup service. An agent runs on the Visual Server and incrementally backs up system software, operational databases and long-term input data storage to a secure data center. This backup service is optional as in-house corporate server backup procedures and systems can be used to accomplish the same backup procedure. No other administrative maintenance tasks are necessary for the Visual Server.

Visual Server's capacity for storing web server data in days is determined in the following manner:
  1. System software requires approximately 100 MB of disk space.
  2. The example client application (Visual Site) database requires approximately 10 GB of disk space.
  3. The compressed web server log input files require storage space based on the number of web site visits and ratio at which Visual Server is able to compress the data for storage. The following is a typical example and summary for a mid-sized web site:

| System Software Requirements (MB) | Operational Database Storage Requirements (GB) | Web Server Data Per day (MB) | Compression Ratio of Web Server Data | Compressed Storage Per Day (MB) | Days of Storage Allocated | Annual Storage Web Server data (MB) | Total Storage Requirements (1 Year) (GB) |
|---|---|---|---|---|---|---|---|
| 100 | 10 | 100 | 0.4 | 40 | 365 | 14600 | 24.7 |

The Visual Server includes a configuration file that permits the user to adjust the Visual Server settings.

C. Visual Workstation

The Visual Workstation is an integrated executive graphics workstation that allows users to immediately access, visualize and analyze up-to-the-minute information from a data source or set of data sources (such as HTTP or web sites with the Visual Site application). The Visual Workstation includes specific graphics hardware and RAM configurations to provide its highly graphical, high resolution interface. The Visual Workstation provides an underlying facility for running applications like Visual Site and receives data from the Visual Server. In addition, the Visual Workstation includes software for general operation of the workstation, such as operating system software and other software products necessary for utilization of the workstation hardware and software.

The Visual Workstation includes generic functionality that is used to support numerous applications (e.g., Visual Site) such as:

1. The ability to generate multiple visualizations in a user's interface.
2. The ability to group multiple visualizations into workspaces that scope queries.
3. The ability for a user to select parts of the visualizations to generate a query that the workstation query engine and data analysis facility understands.
4. The ability to save visualizations with their selections to persisted files that can be reloaded or messaged to others with the same dataset.
5. The ability for the workstation to connect to the server to gain access to incoming data that would update its local database.

The Visual Workstation includes a graphics engine that generates the user interface including hundreds of different graphical representations of data in the form of one dimensional, two dimensional, three dimensional, and multi-dimensional visualizations as well as spreadsheet like tables, line graphs, skatter plots, and others identified above.

Visual Workstation also includes a query engine that allows users to click on elements of visualizations that represent underlying data to subset or query the data that they are viewing. Users can select multiple elements in multiple visualizations to define advanced queries easily.

The Visual Workstation may include any suitable computer system. The table below provides examples of two desktop computer systems that are suitable for operation as the Visual Workstation.

| Vendor | Dell | IBM |
|---|---|---|
| Model | Dimension 8100 | |
| Processor | >1 Ghz | >1 Ghz |
| Monitor-Screen | 17" RGB LCD | 17" RGB LCD |
| RDRAM | 512 MB | 512 MB |
| Hard Disk Drive | 40 GB | 40 GB |

-continued

| Vendor | Dell | IBM |
|---|---|---|
| Graphics Card | 32 MB NVidia Gforce 2 MX | 32 MB NVidia Gforce |
| USB Ports | 2 | 2 |
| 1394 (Firewire) Ports | 1 | 1 |
| Ethernet Ports (100BaseT) | 1 | 1 |
| CD-ROM | 1 | 1 |
| DVD-ROM | 1 | 1 |
| Screen Resolution | 1600 × 1200 | 1600 × 1200 |
| Floppy Disk Drive | 1.44 | 1.44 |
| Link to Product Lit. | | |
| Pointing Device | Microsoft Optical | Microsoft Optical |
| Operating System | Windows 2000 Pro | Windows 2000 Pro |
| Microsoft Office | Standard | Standard |
| Color of Unit | Black | Black |

Alternately, the Visual Workstation may be comprised of a notebook computer. The table below provides examples of two notebook computer systems that are suitable for operation as the Visual Workstation.

| Vendor | Dell | IBM |
|---|---|---|
| Model | Inspiron 8100 | |
| Processor | >=1 Ghz | >=1 Ghz |
| Screen | 15" RGB LCD | 15" RGB LCD |
| Random Access Memory | 512 MB | 512 MB |
| Hard Disk Drive | 40 GB | 40 GB |
| Graphics Card | 32 MB NVidia Gforce 2 Go | NVidia Gforce 2 Go |
| USB Ports | 2 | 2 |
| 1394 (Firewire) Ports | 1 | 1 |
| Ethernet Ports (100BaseT) | 1 | 1 |
| CD-ROM | 1 | 1 |
| DVD-ROM | 1 | 1 |
| Screen Resolution | 1600 × 1200 | 1600 × 1200 |
| Floppy Disk Drive | 1.44 | 1.44 |
| Link to Product Lit. | | |
| Pointing Device | Microsoft Optical | Microsoft Optical |
| Operating System | Windows 2000 Pro | Windows 2000 Pro |
| Microsoft Office | Standard | Standard |
| Color of Unit | Black | Black |

Figure 5:
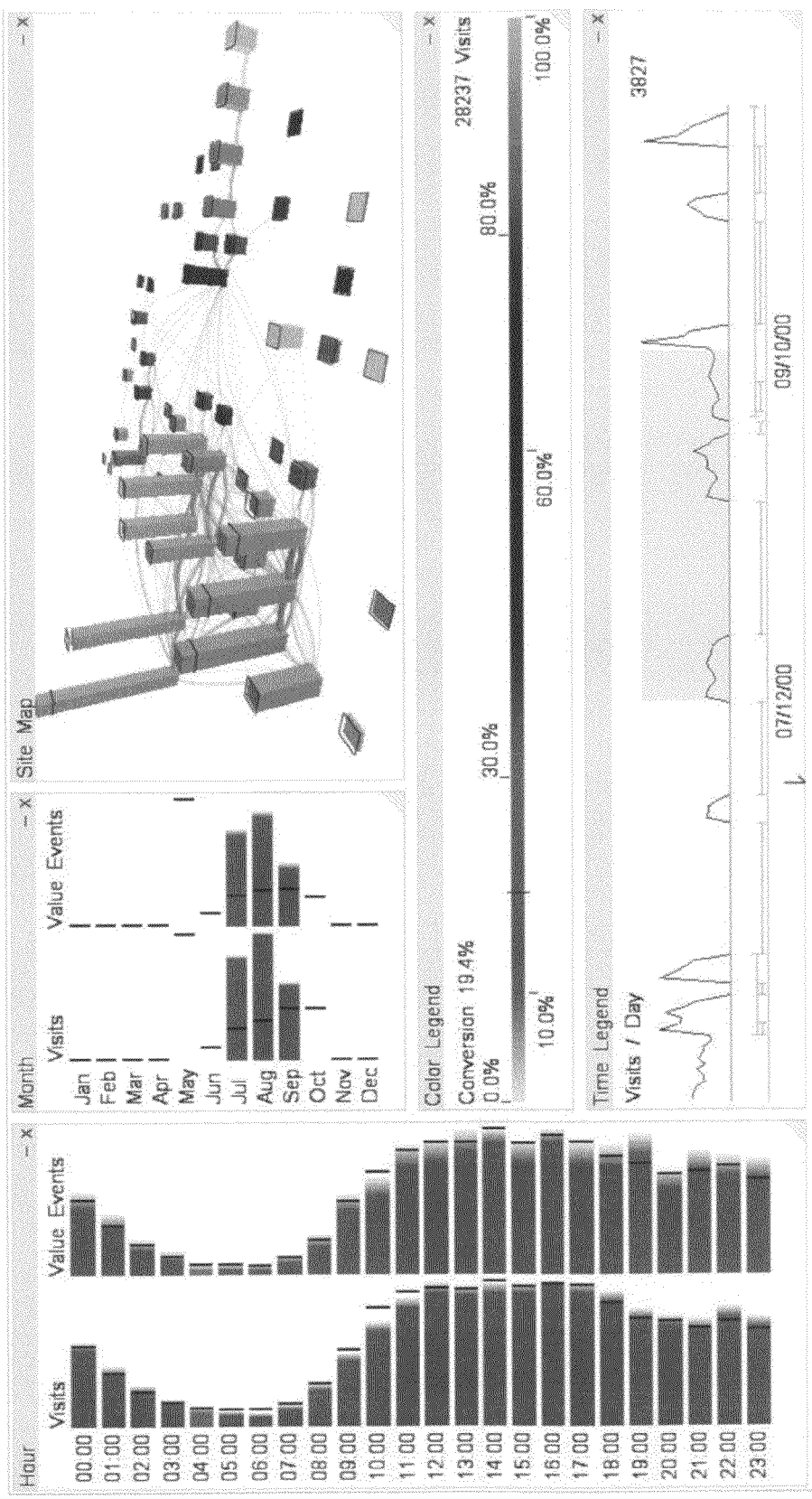
FIG. 5 is an illustrative workspace window generated by the system for processing and visualization of information of the present invention including multiple visualization windows showing a Color Ramp Metrics workspace.
Figure 6:
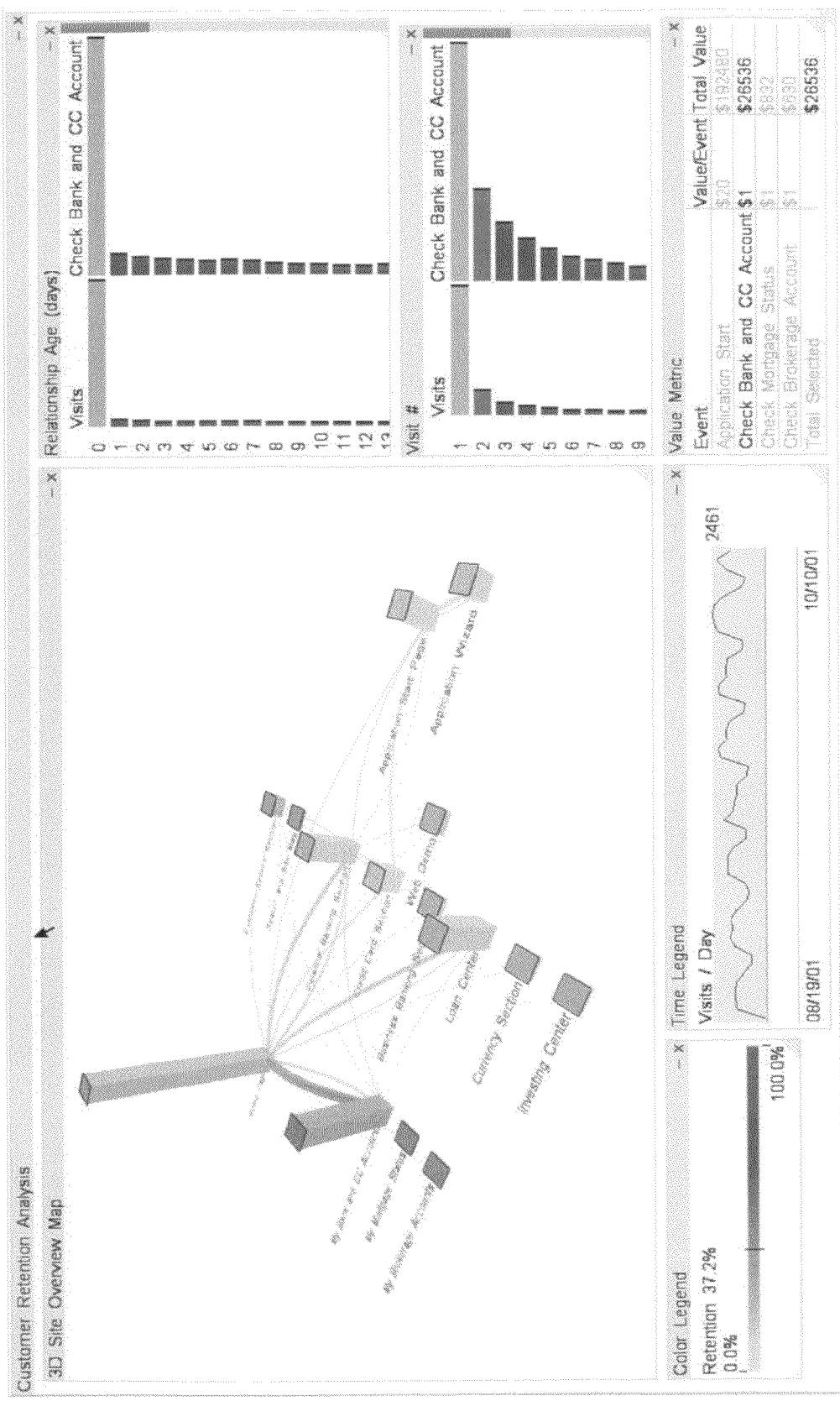
FIG. 6 is an illustrative workspace window generated by the system for processing and visualization of information of the present invention including multiple visualization windows showing a Customer Retention Analysis workspace.
Figure 7:
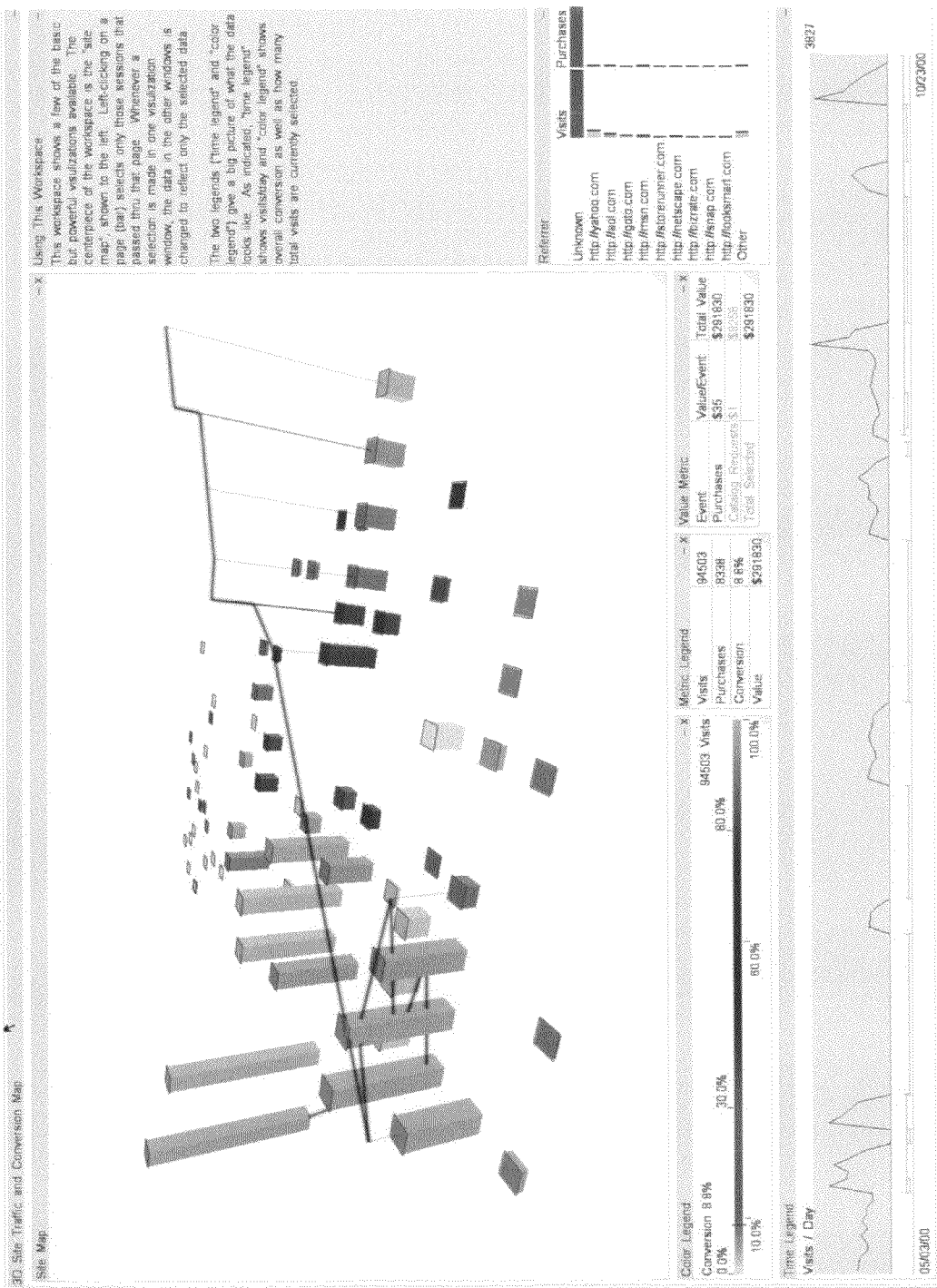
FIG. 7 is an illustrative workspace window generated by the system for processing and visualization of information of the present invention including multiple visualization windows showing an Individual Mapped Sessions workspace.
Figure 8:
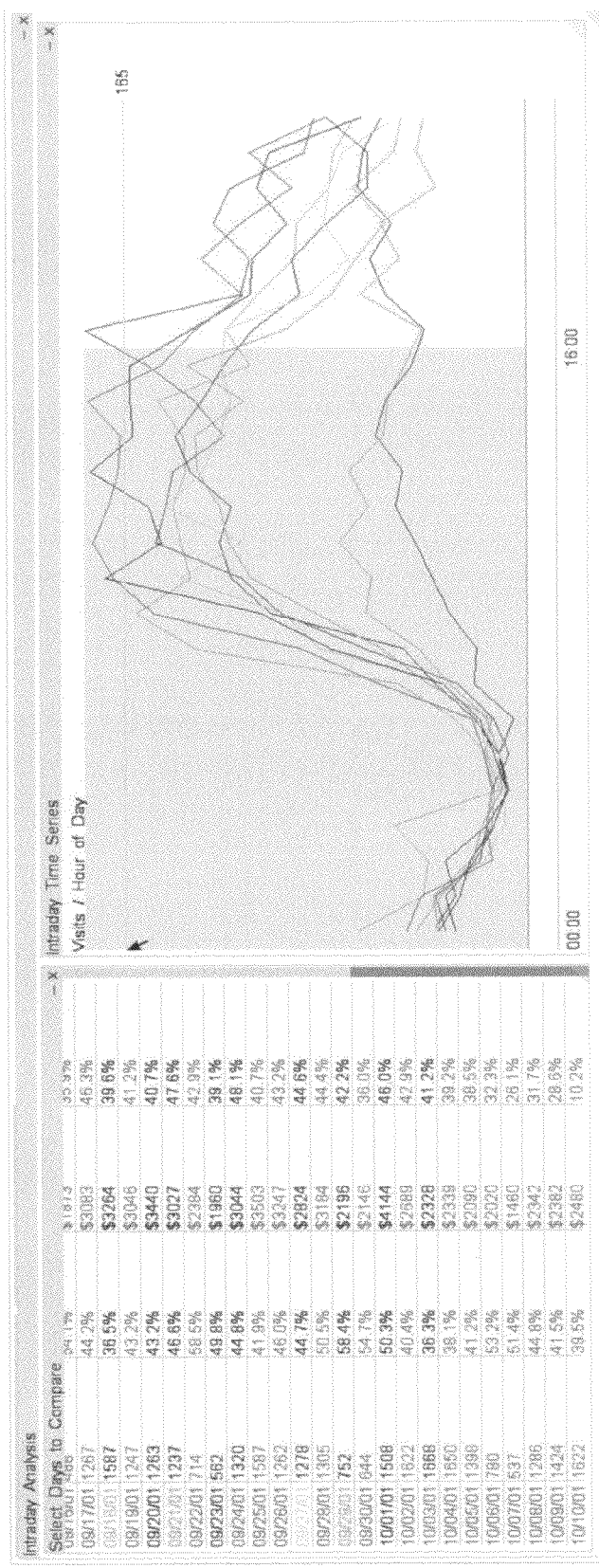
FIG. 8 is an illustrative workspace window generated by the system for processing and visualization of information of the present invention including multiple visualization windows showing an Intraday Analysis workspace.
Figure 9:
FIG. 9 is an illustrative workspace window generated by the system for processing and visualization of information of the present invention including multiple visualization windows showing a Metrics and Timeline workspace.
Figure 10:
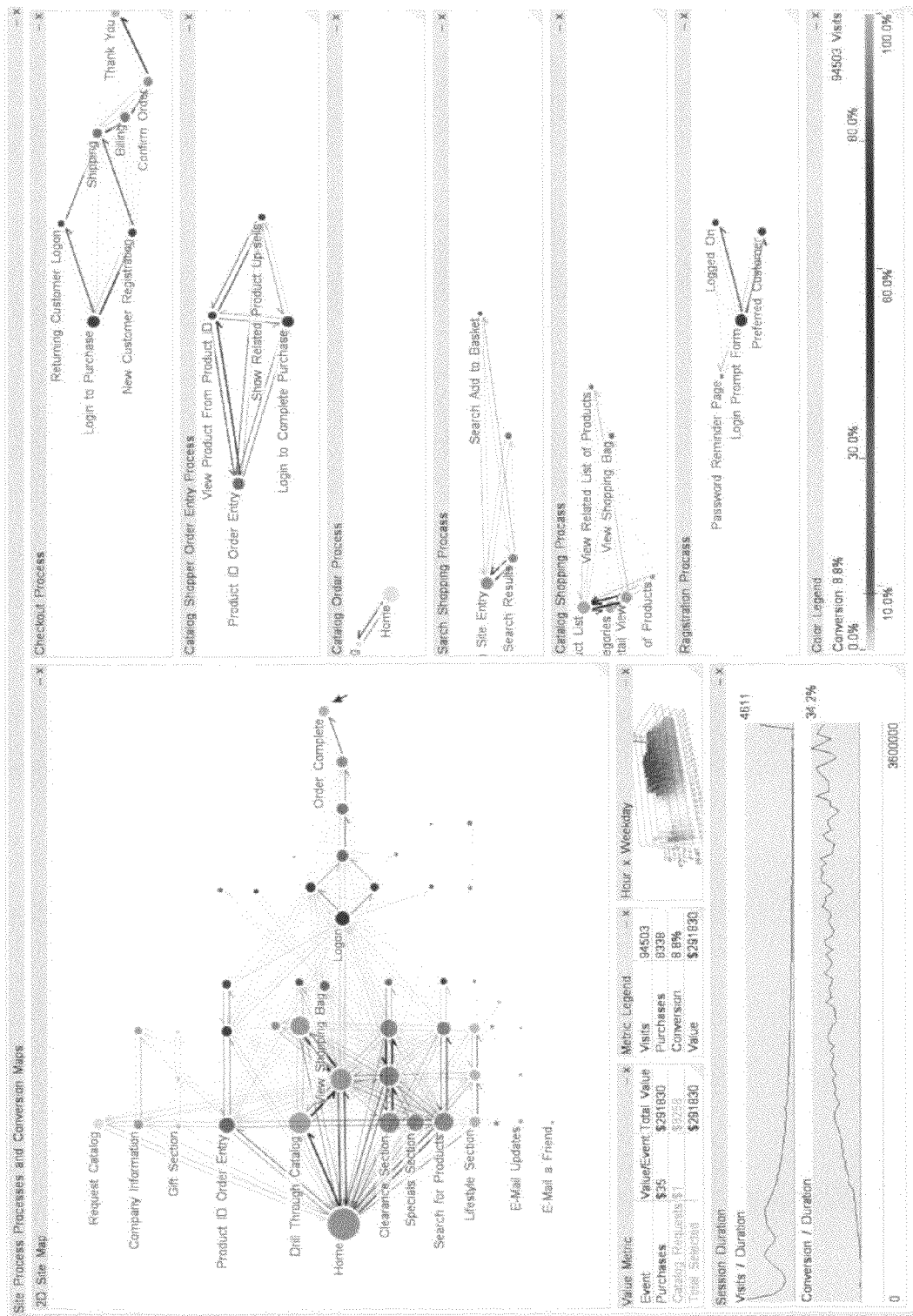
FIG. 10 is an illustrative workspace window generated by the system for processing and visualization of information of the present invention including multiple visualization windows showing a Process Analysis workspace.
Figure 11:
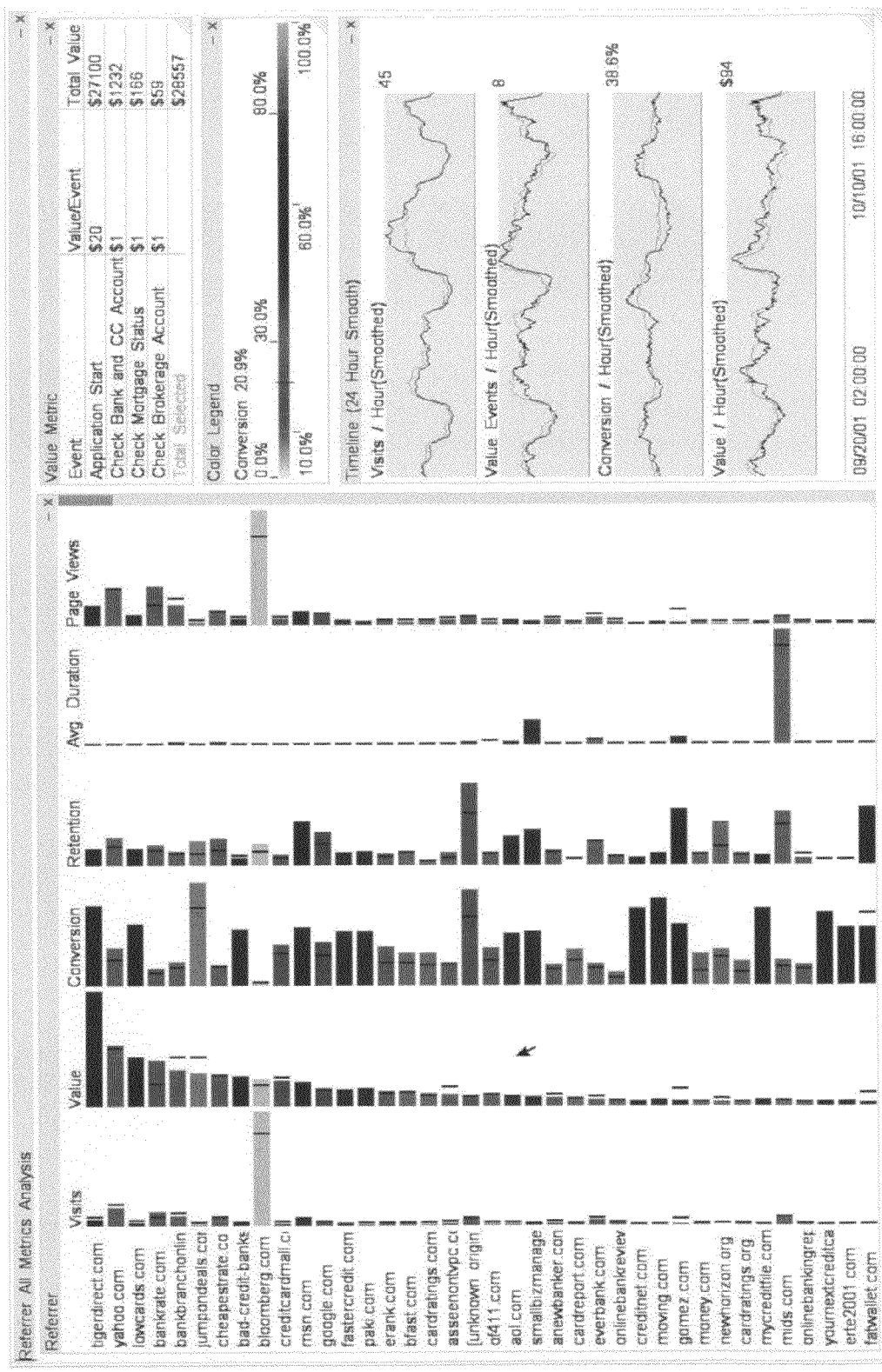
FIG. 11 is an illustrative workspace window generated by the system for processing and visualization of information of the present invention including multiple visualization windows showing a Referrer all Metrics workspace.
Figure 12:
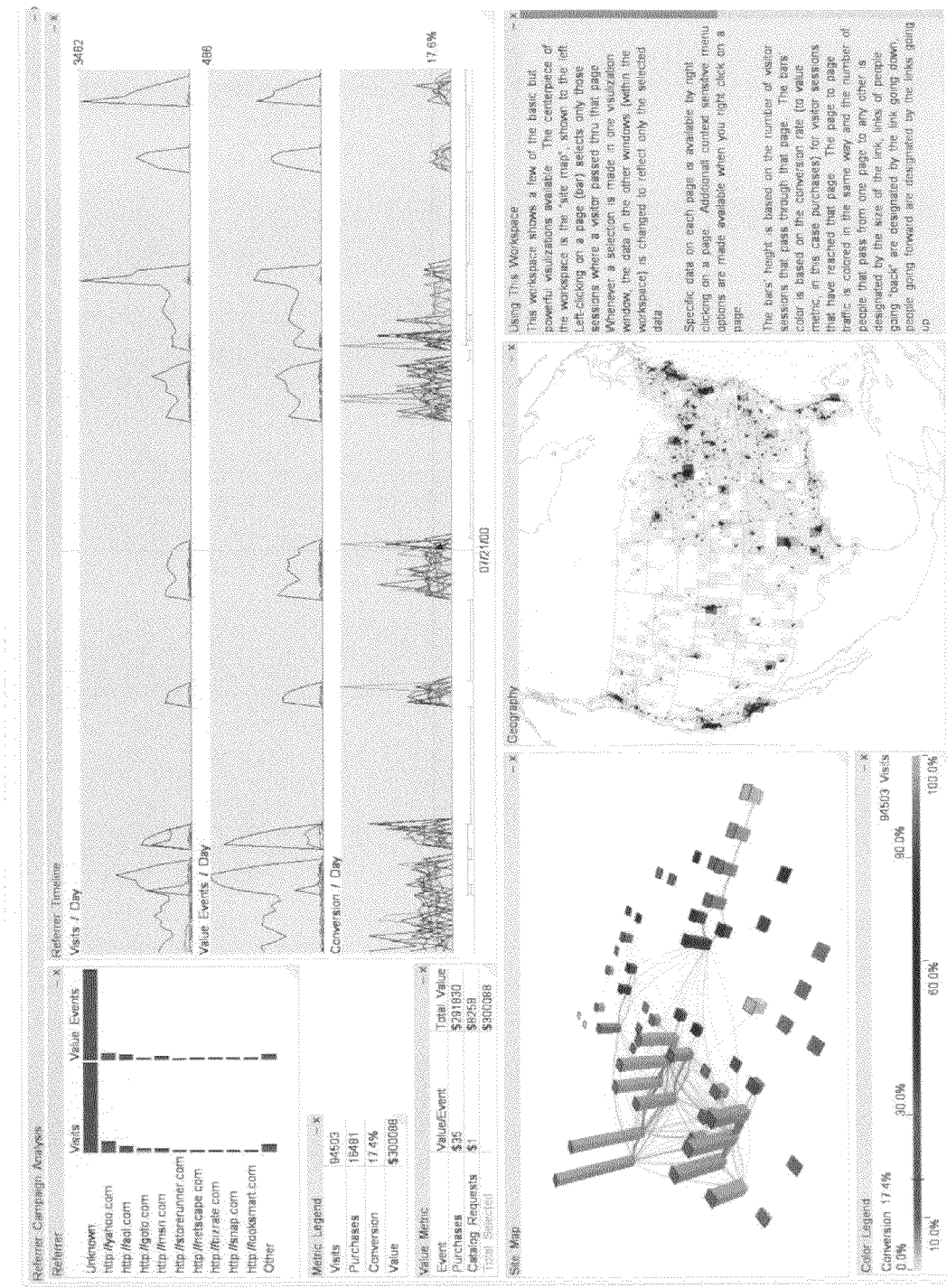
FIG. 12 is an illustrative workspace window generated by the system for processing and visualization of information of the present invention including multiple visualization windows showing a Referrer Analysis workspace.
Figure 13:
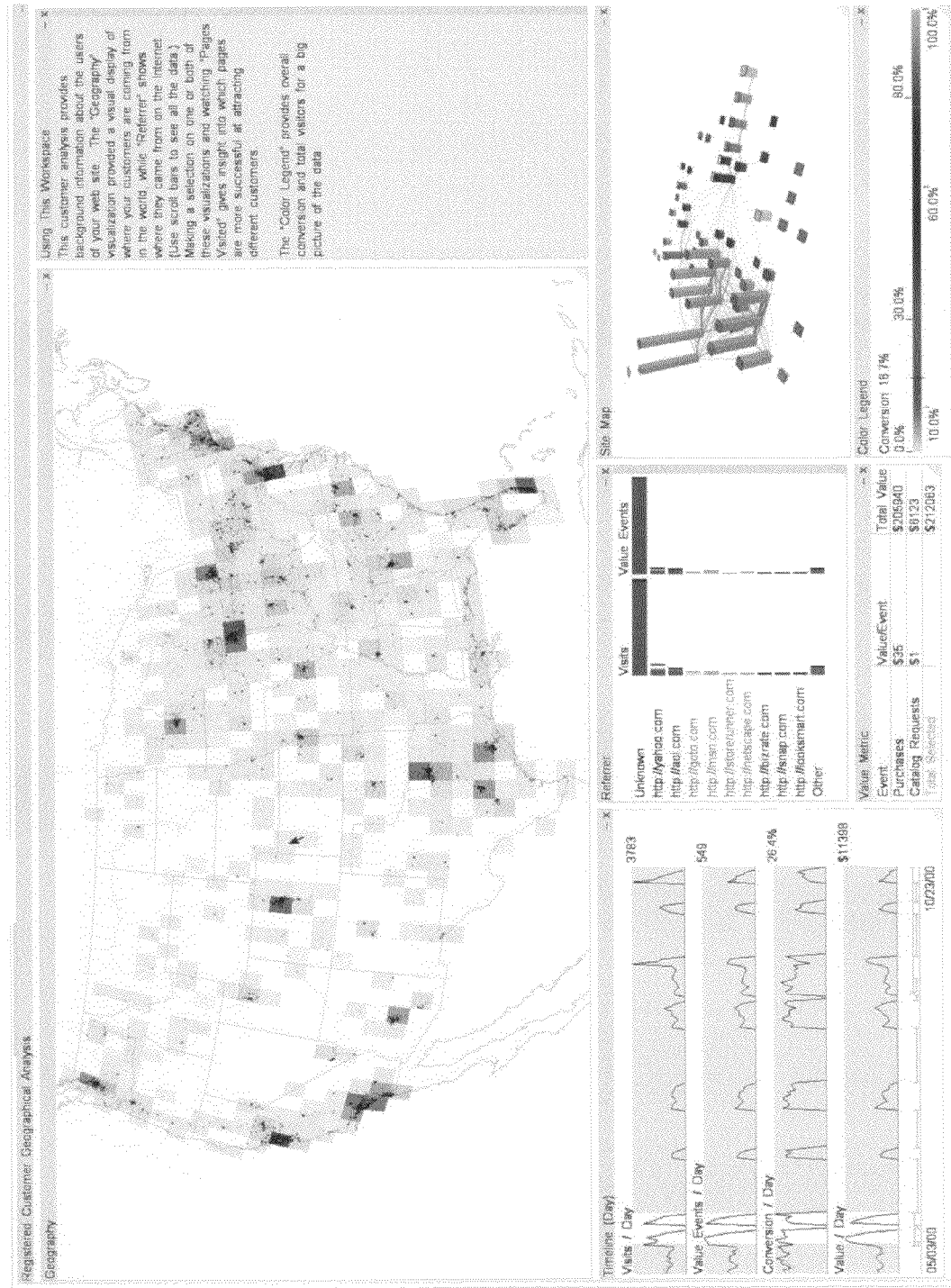
FIG. 13 is an illustrative workspace window generated by the system for processing and visualization of information of the present invention including multiple visualization windows showing a Registered Customer Geography workspace.
Figure 14:
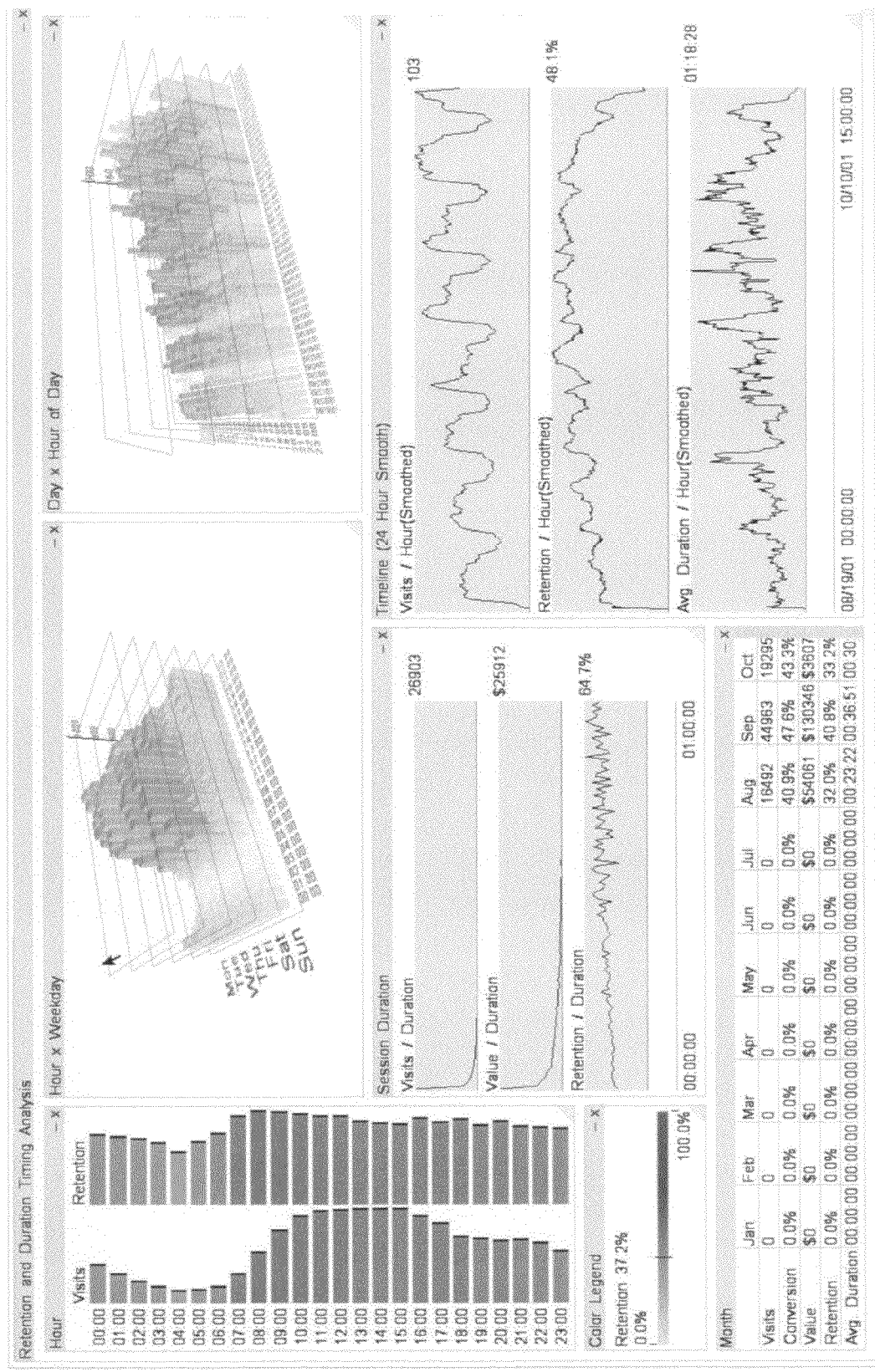
FIG. 14 is an illustrative workspace window generated by the system for processing and visualization of information of the present invention including multiple visualization windows a Retention and Duration Timing workspace.
Figure 15:
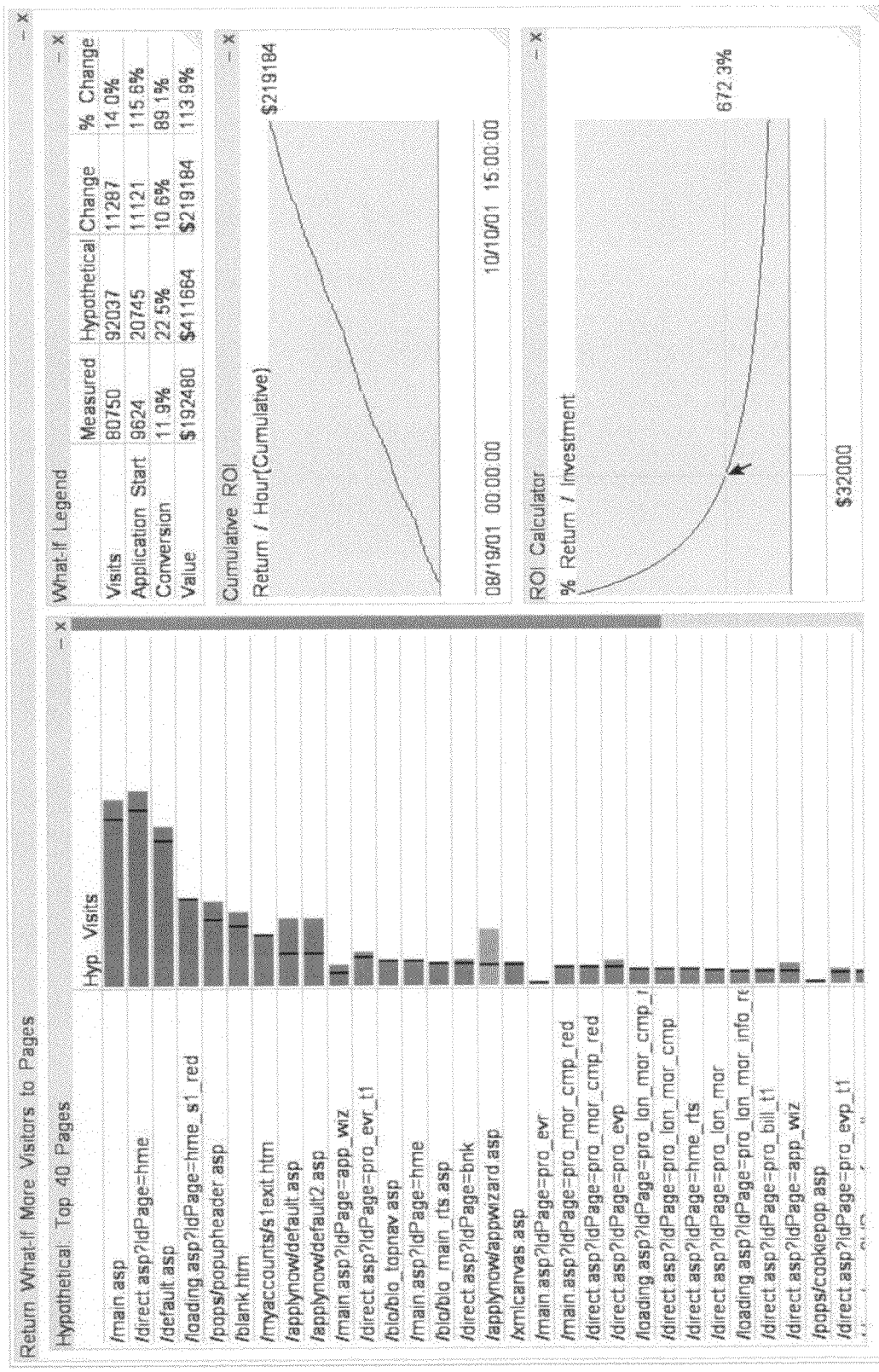
FIG. 15 is an illustrative workspace window generated by the system for processing and visualization of information of the present invention including multiple visualization windows showing a Return What-if More Visitors to Pages workspace.
Figure 16:
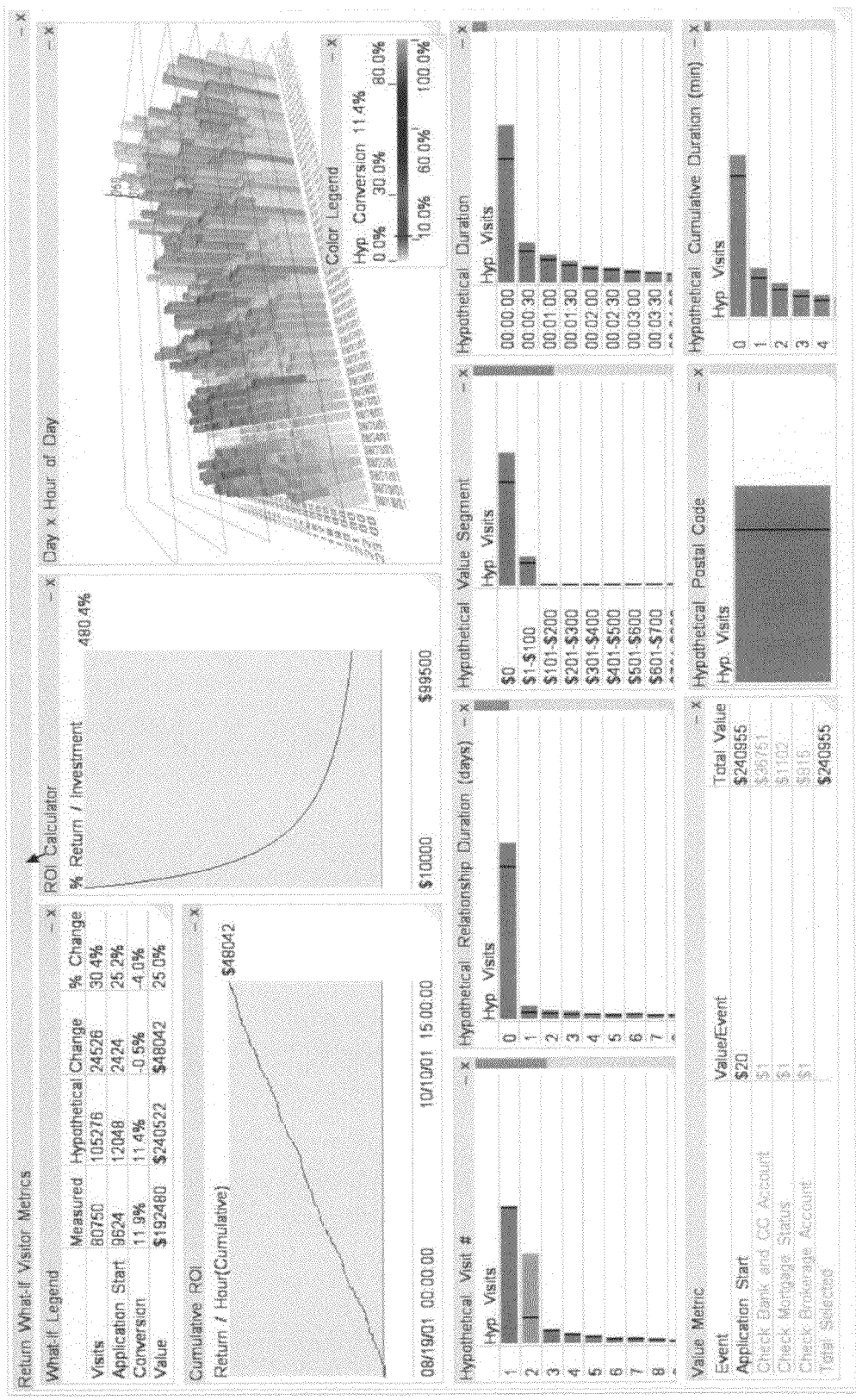
FIG. 16 is an illustrative workspace window generated by the system for processing and visualization of information of the present invention including multiple visualization windows showing a Return What-if Visitor Metrics workspace.
Figure 17:
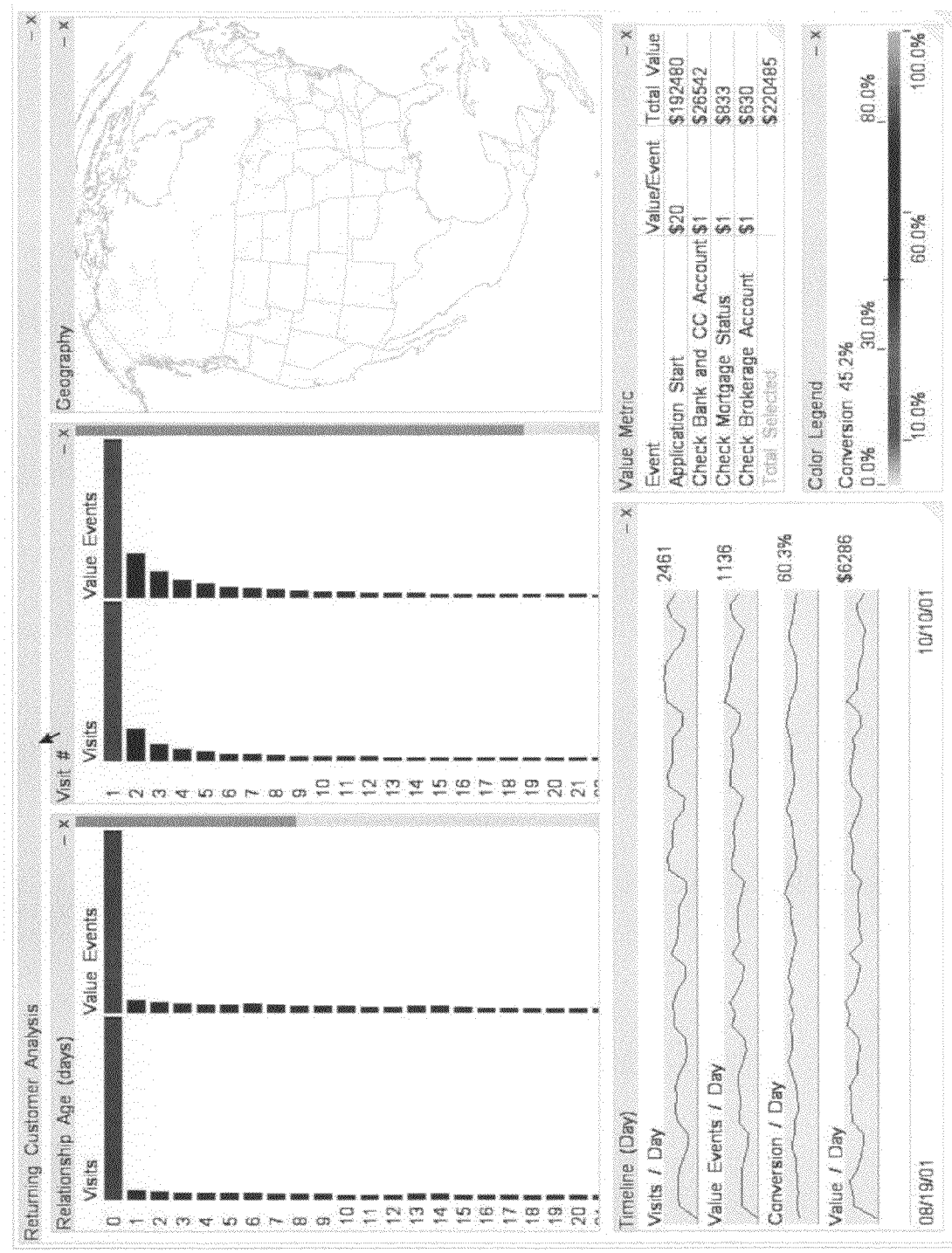
FIG. 17 is an illustrative workspace window generated by the system for processing and visualization of information of the present invention including multiple visualization windows showing a Returning Customer Analysis workspace.
Figure 18:
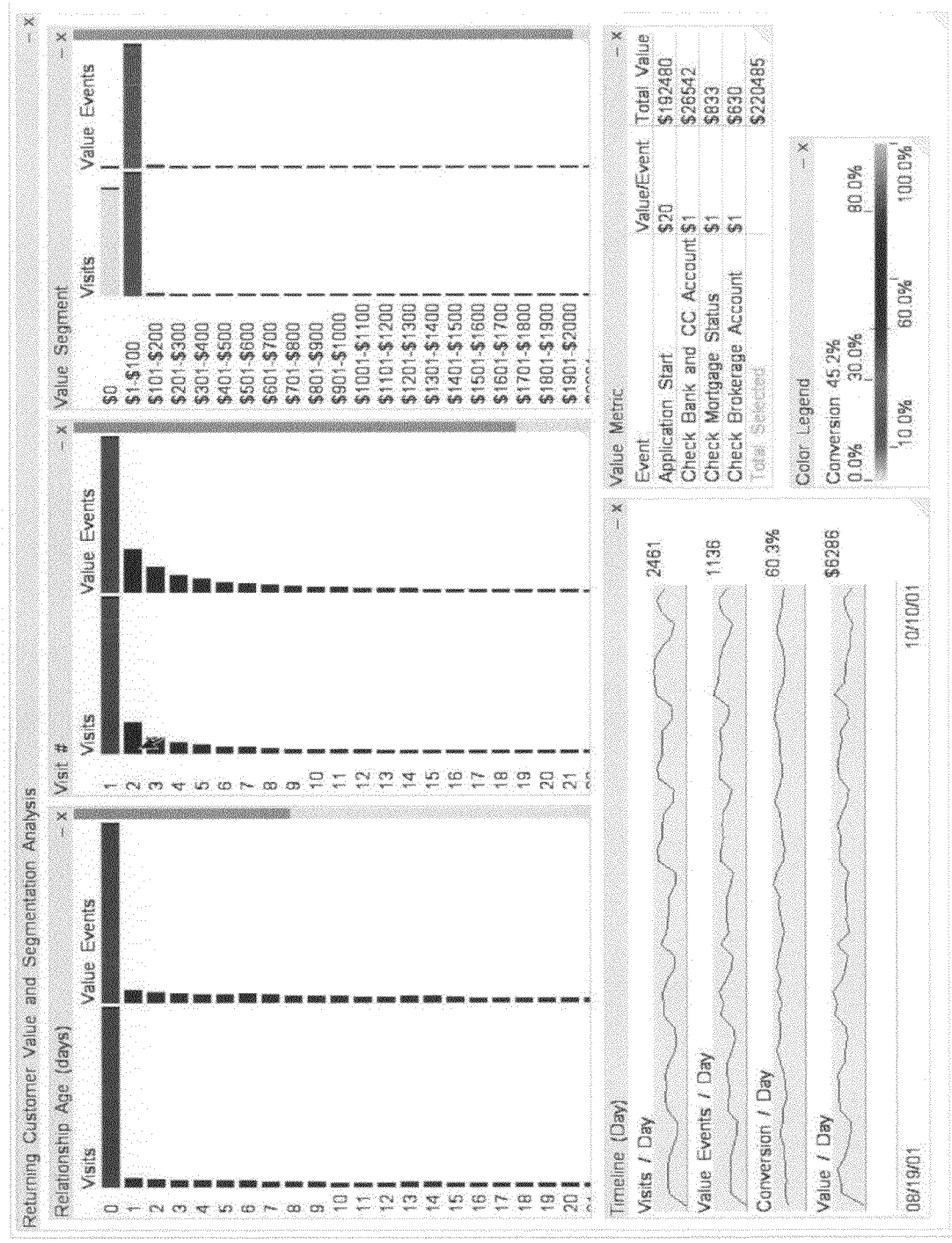
FIG. 18 is an illustrative workspace window generated by the system for processing and visualization of information of the present invention including multiple visualization windows showing a Returning Customer Value Segmentation workspace.
Figure 19:
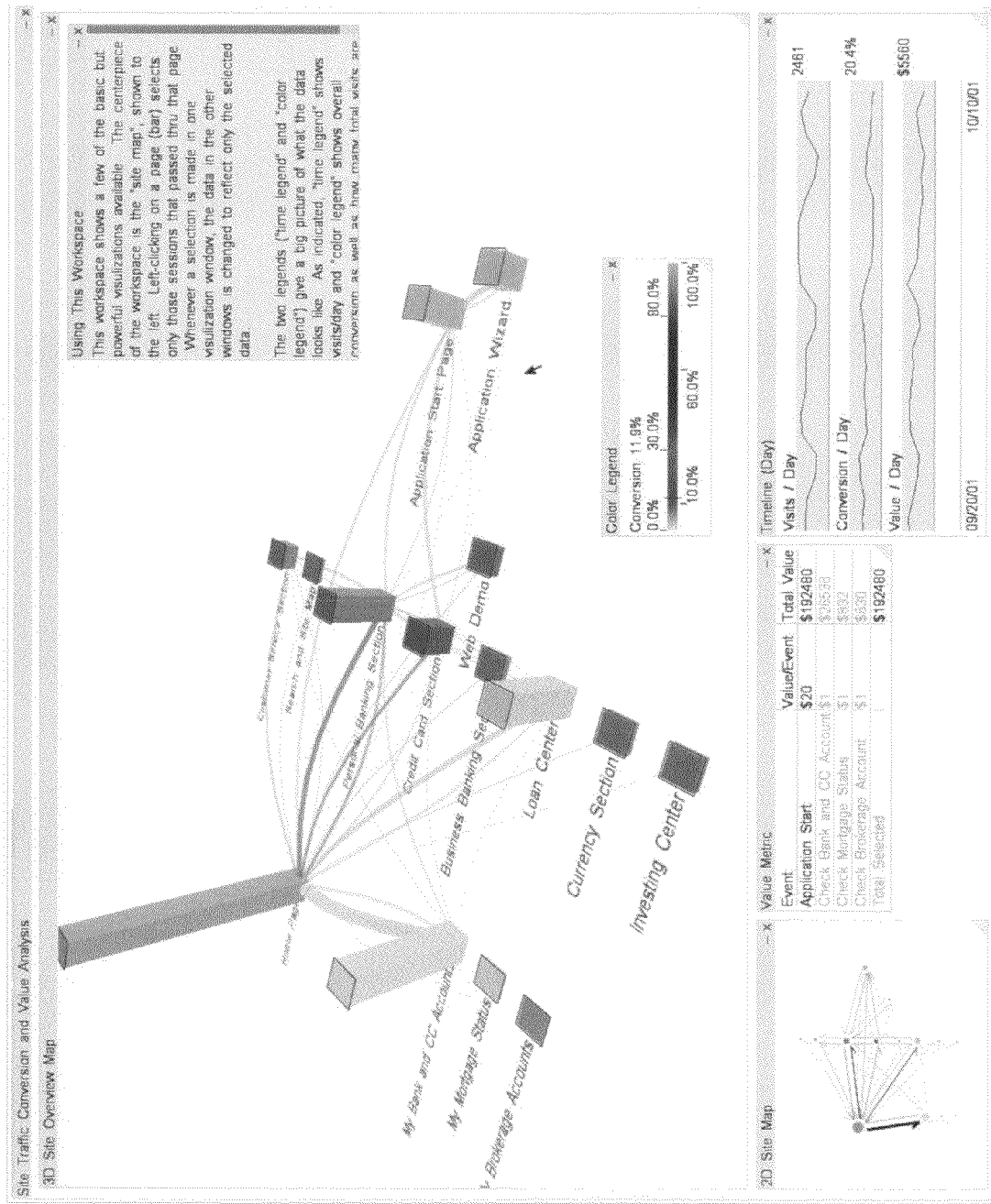
FIG. 19 is an illustrative workspace window generated by the system for processing and visualization of information of the present invention including multiple visualization windows showing a Site Traffic Conversion and Value Analysis workspace.
Figure 20:
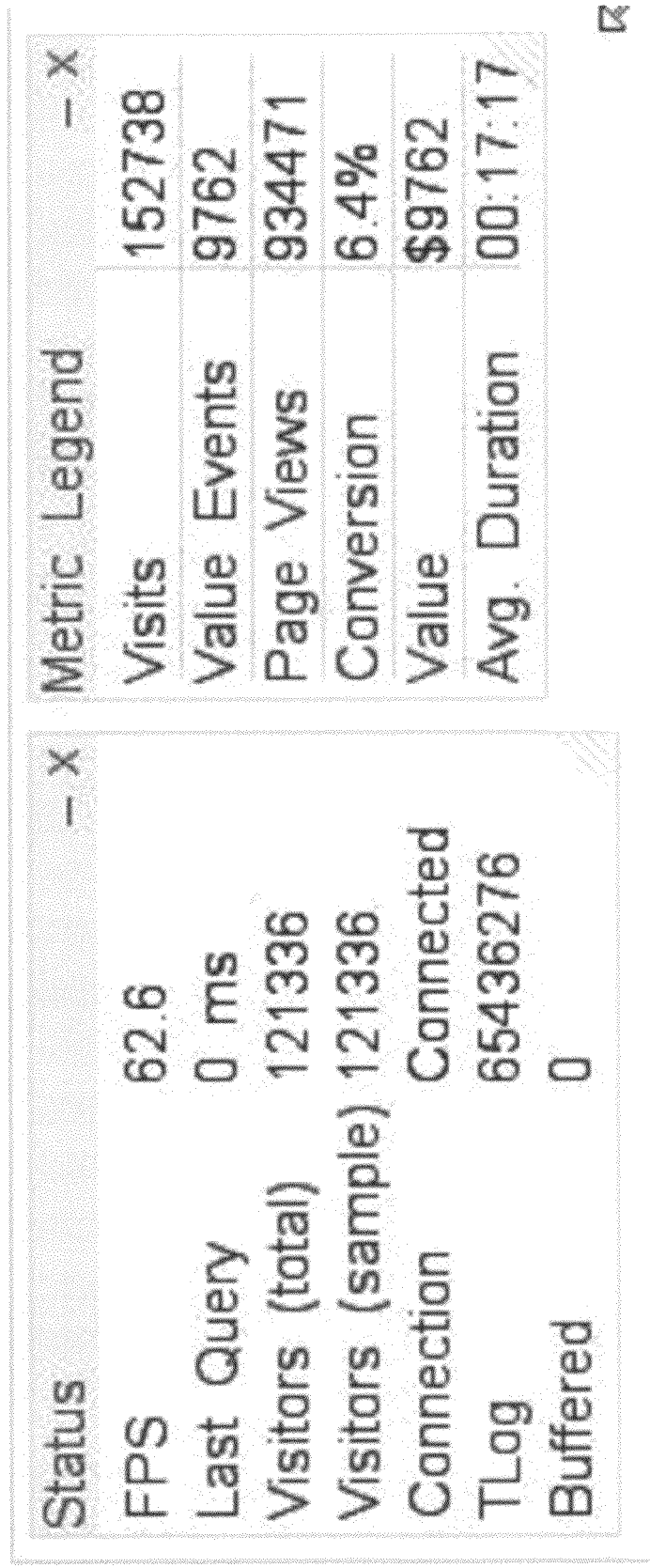
FIG. 20 is an illustrative workspace window generated by the system for processing and visualization of information of the present invention including multiple visualization windows showing a Status and Metric Legend.
Figure 21:
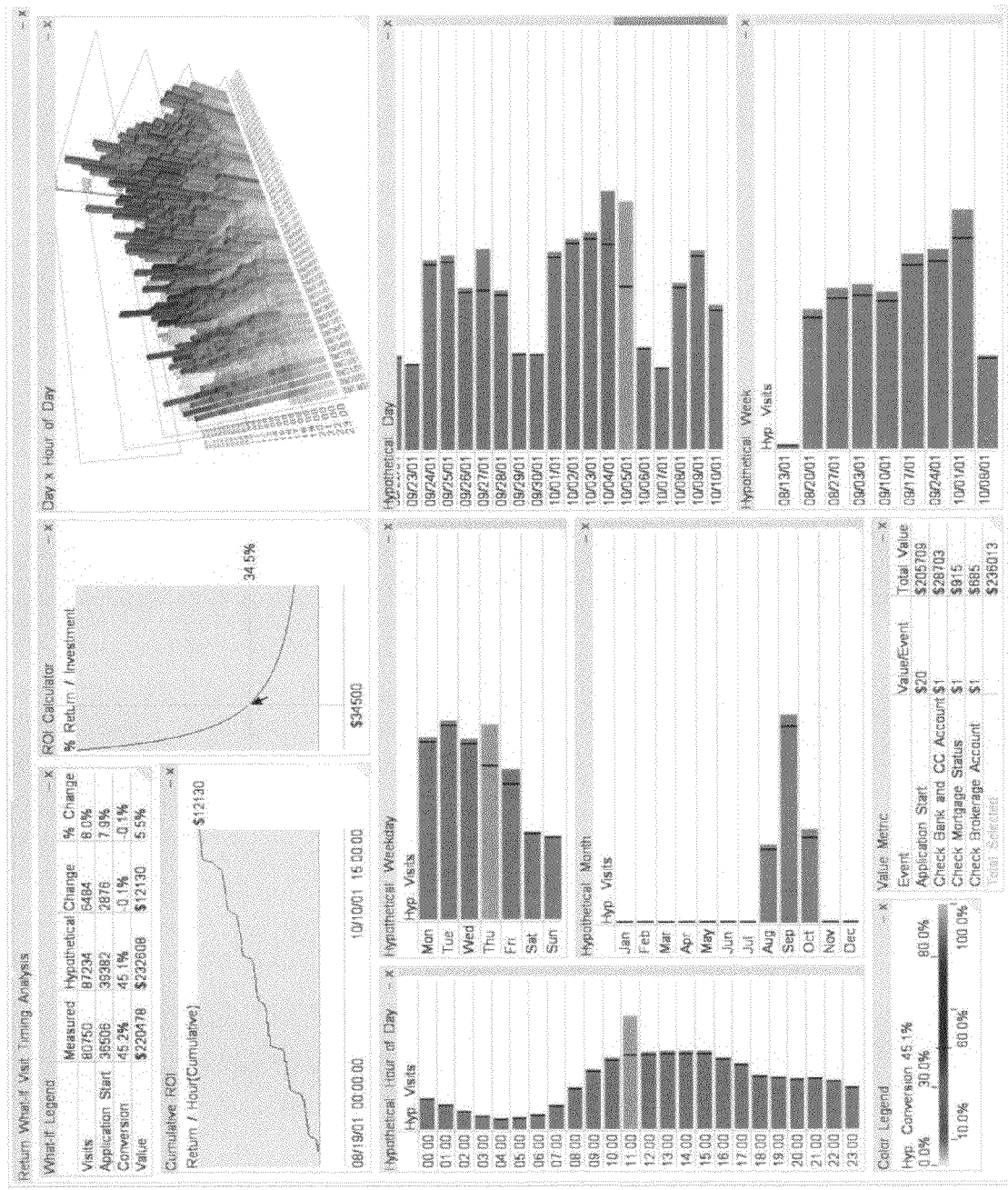
FIG. 21 is an illustrative workspace window generated by the system for processing and visualization of information of the present invention including multiple visualization windows showing a Visit Timing Return What-if workspace.
Figure 22:
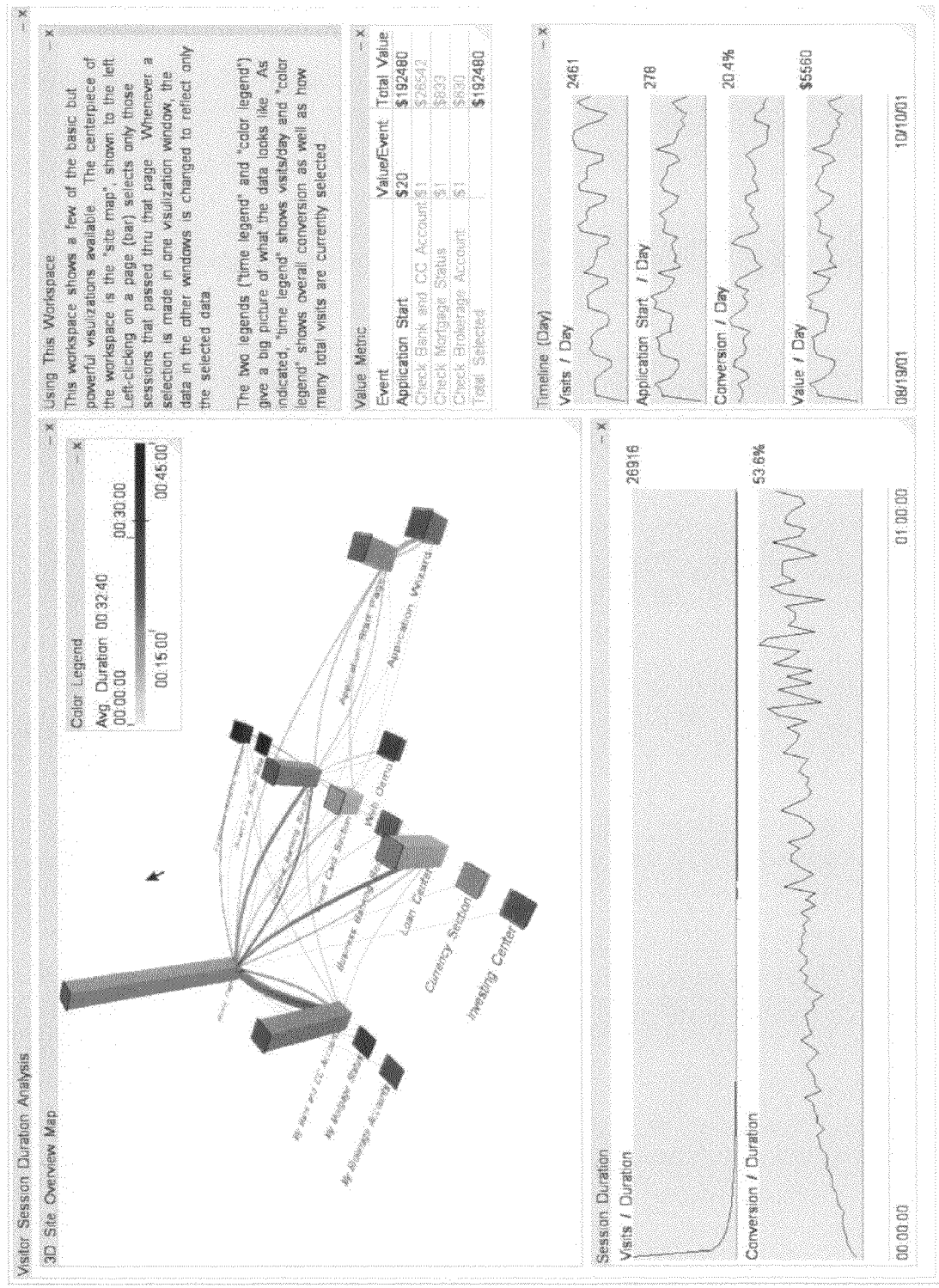
FIG. 22 is an illustrative workspace window generated by the system for processing and visualization of information of the present invention including multiple visualization windows showing a Visitor Session Duration Analysis workspace.
Figure 23:
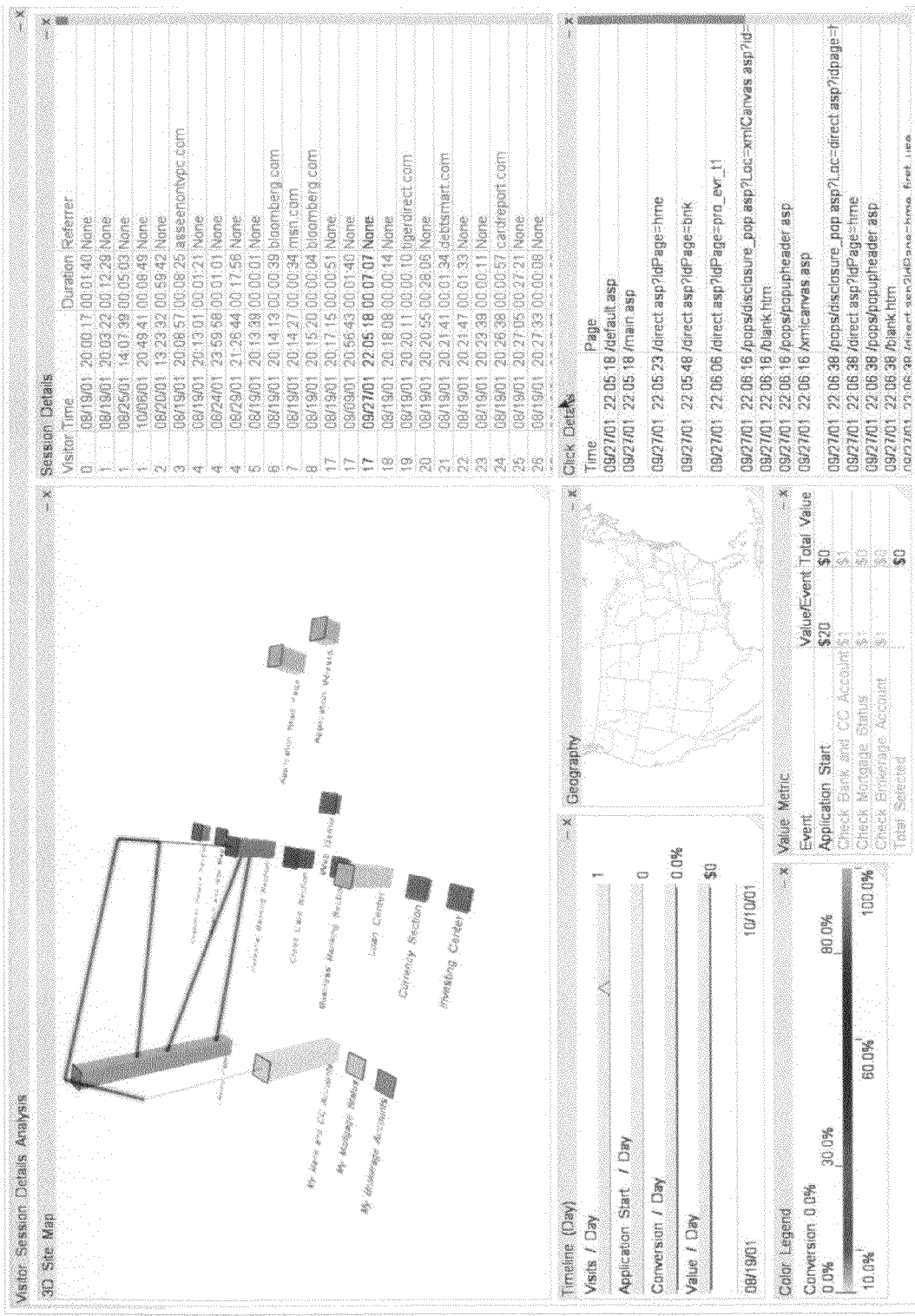
FIG. 23 is an illustrative workspace window generated by the system for processing and visualization of information of the present invention including multiple visualization windows a Visitor Session Detail workspace.
Figure 24:
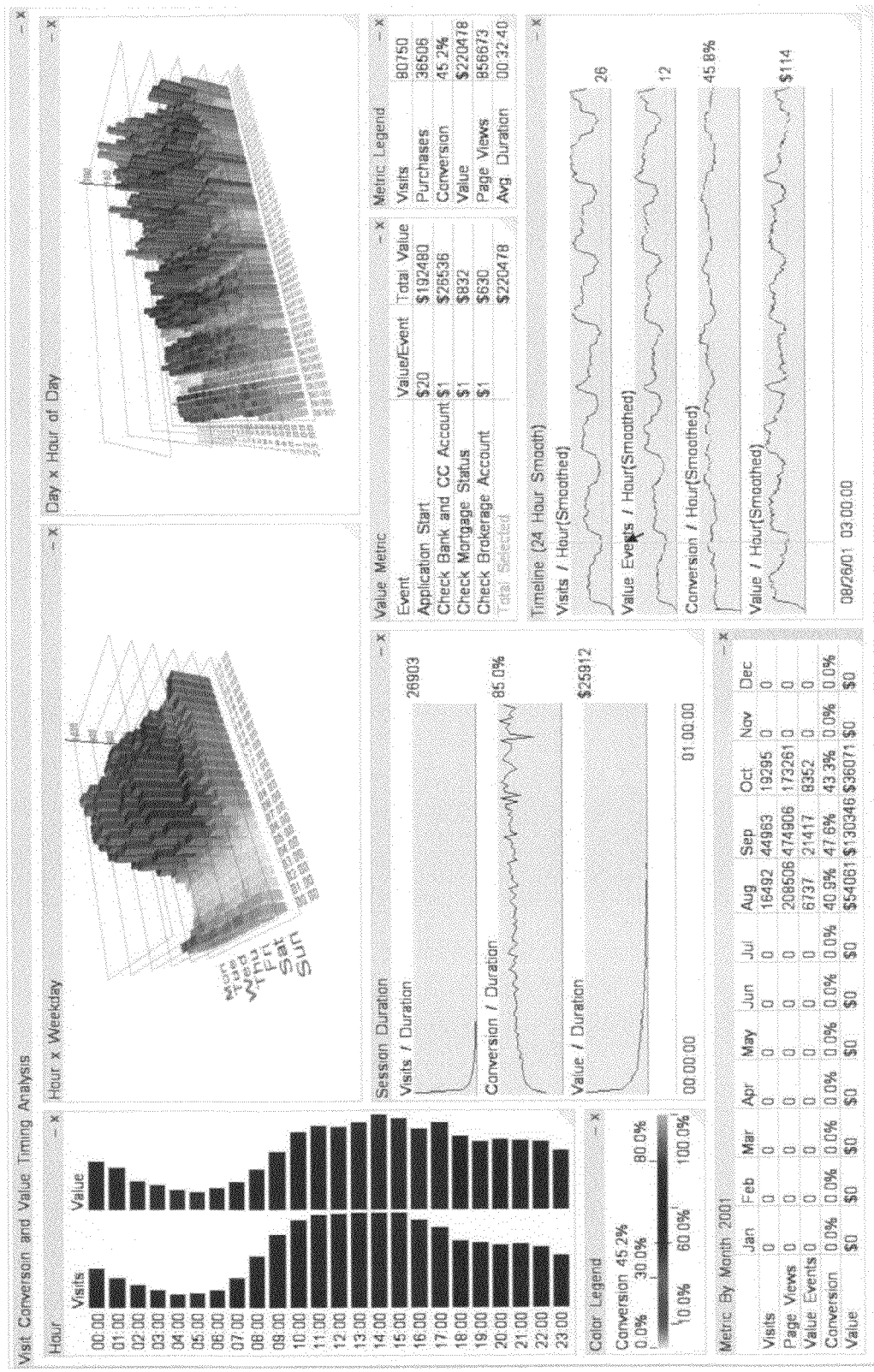
FIG. 24 is an illustrative workspace window generated by the system for processing and visualization of information of the present invention including multiple visualization windows showing a Visits Conversion and Value workspace.
Figure 25:
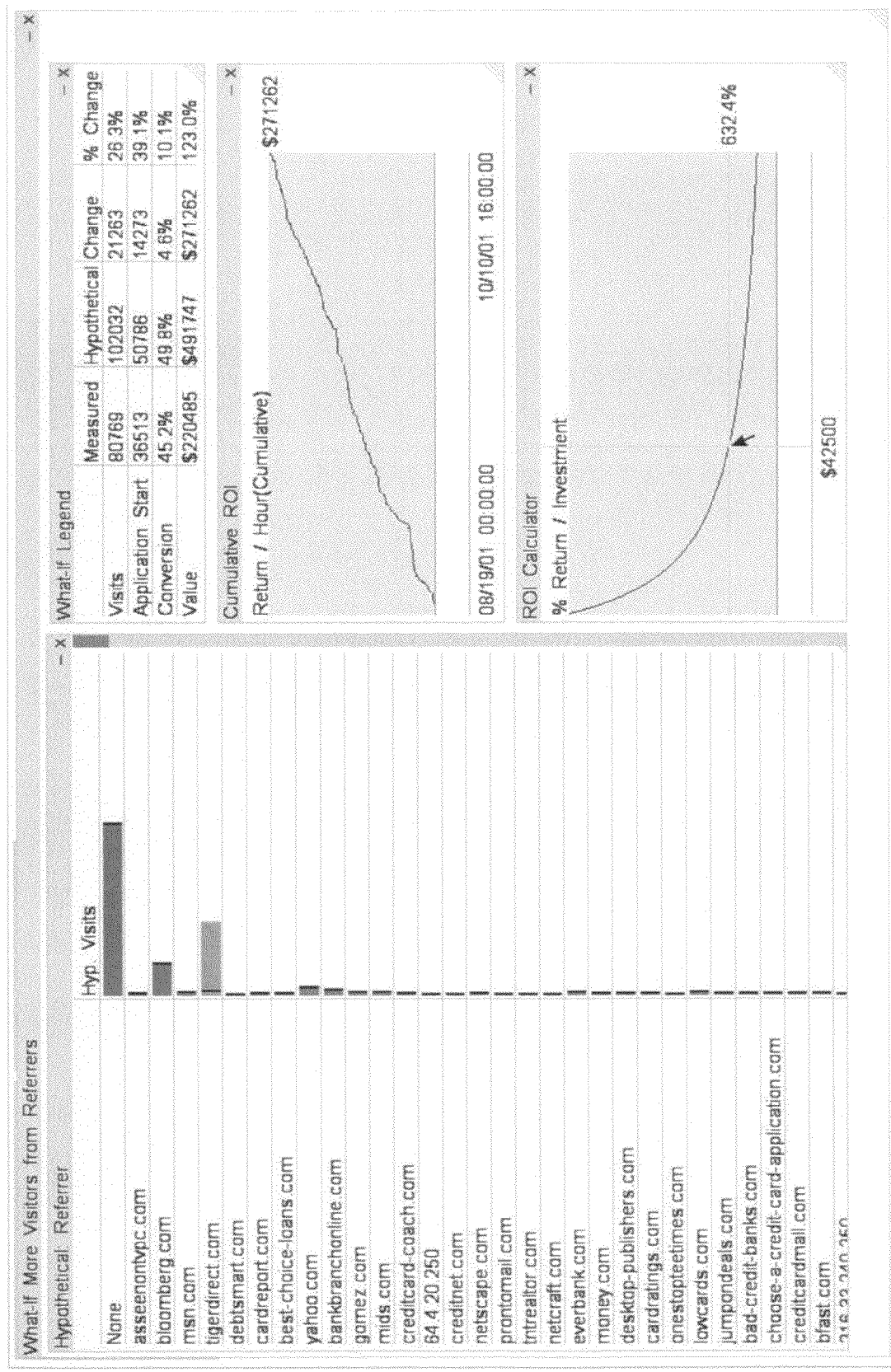
FIG. 25 is an illustrative workspace window generated by the system for processing and visualization of information of the present invention including multiple visualization windows showing a What-if More Visitors from Referrer workspace.

The Visual Workstation in conjunction with the client application provides visualization and multi-visualization including rich, graphical presentation of multivariate data in high quality and frame rates. An arbitrary set of visualizations can be combined to visualize more variables. Visualization types include 1 and 2D bar graphs, tables, cross tabs, line graphs, histograms, timelines, site maps, geographic maps, terrain maps, fish eye lists, scatter plots, directed graphs, sales funnels, customer value pyramids, process flow, process performance plot, spaghetti plot, surface maps, 3D volume maps, 3D scalar fields, 3D vector fields, etc. Examples of such visualizations are shown in FIGS. 5-25.

The information can be presented using numerous presentation techniques such as benchmarks, confidence intervals, color ramp metrics, dynamically filtered dimensions, scales and legends, trellis graphics, smooth transitions, moving average and kernel smoothing for line graphs, and others.

The Visual Workstation also provides a user interface with numerous interaction techniques such as data range selection, sliding window selection, normalize to series, water leveling, selection by water level, choice of series dimensions, move camera, drag, zoom and spin camera, mouse over to display values, context dialogs and menus, axis zooming, axis drilling, and others. Each visualization provides interactive selection techniques to filter the others allowing the user to visually slice and dice the data set.

The Visual Workstation also provides real-time remote viewing to remotely view and monitor (like cameras in a store) a business process and customers' interaction with them. In addition, the system provide real-time response as filtering and other user interface operations complete in about 100 ms or less allowing for animation of multiple on-screen visualizations.

The Visual Workstation also provides trend analysis allowing the use to view the complete history of any value by combining the timeline visualization with others. Derivative indicators (an arrow indicating consistent up or down trend of a particular value in a visualization) highlight values that appear to be following a consistent trend. The user may also annotate the timeline to cross-reference "real" world events, campaigns, outages, etc. that correspond with site activity to maintain accurate history.

One Visual Workstation can subscribe to multiple Visual Servers allowing its user to monitor and analyze multiple distinct sites or other data services (permitting multi-source data merging). As an example of the multi-source data merging of the present invention, data from a site can be merged with data from Nasdaq to allow the users of Visual Workstation to explore correlations between their operations and the movements of the markets. In addition, the user can perform a specification search for a selection to locate dimensions in which the current selection is unusual, thereby leading to the identification of causal events.

Clustering is implemented based on clickstream feature extraction. A large number of variables are generated and clustering techniques are used in the Visual Workstation to identify the important predictors. The objective is to classify sessions into groups so that the groups are (1) descriptive or (2) predictive of some variable or (3) both. The steps for implementing this feature include:

1. Feature extraction—a variety of metrics are calculated about each session, e.g.,
   a. number of clicks;
   b. number of different pages hit;
   c. number of different sections hit;
   d. duration;
   e. search used;
   f. number of product view pages hit;
   g. number of information pages hit;
2. Cluster generation—a data mining algorithm is used to reduce the set of variables and then to identify a set of descriptive or predictive clusters. Each cluster becomes an element in a new dimension;
3. Session clustering—Each session is assigned to a cluster according to the definition of the clusters;
4. Investigation—The analysis features of workstations are used to examine the resulting clusters, decide how to name them descriptively, etc.

The Visual Workstation provides regression analysis modeling relationships between metrics (e.g., QoS, conversion rates, etc.). In addition, the user can explore models by creating decision trees, association graphs, scatter plots with trend lines for regressions, and other methods. Using logistic regression provides precise predictions of how changing page load times will change the probability of purchase.

Visual Workstation displays the English language equivalent of a complex query made by selecting points and areas on visualizations in a window on the screen, if so desired. It is easy to see from the English language descriptions of the actual selections that users are able to much more rapidly and effectively define queries or selections through pointing and clicking on well labeled visualizations than through any other method that does not require years of training.

Multiple Visual Workstations can be connected to Visual Server (in the method discussed below). In essence, once initial data is delivered to all Visual Workstations, only update information needs to be sent to them on an ongoing basis. This updating process puts a minimal load on the server and allows Visual Server to support many Visual Workstations. Specific calculations, which are well known in the art, can be run to determine this number based on a particular VOLAP platform configuration.

When the Visual Site application and the Visual Workstation that it is running on are disconnected from the network, the user can access all of the data that has been loaded into Visual Workstation up to that point. This enables the user to do perform the vast majority of tasks that he or she needs to, or would like to, do without being connected at all. The user, of course, will not receive incremental updates or real-time data feeds again until reconnected to the network.

1. Workspace

A Workspace is an interface construct developed into Visual Workstation and is the basic unit of user activity in Visual Workstation—like a 'document' or 'file' in other applications. A Workspace allows multiple visualizations to be organized into one larger window to depict multiple related views of data that help a user understand and evaluate, in the case of Visual Site, a business process, a campaign, a segment of customers or some aspect of system performance. Each workspace belongs to a specific application (such as Visual Site) although multiple workspaces from different applications can coexist on the same Visual Workstation. Workspaces provide customizability, since a workspace can be created and saved to support some specific analysis task and Workspaces help to amortize the work of choosing and arranging visualizations over several uses. Thus, there is a tremendous amount of flexibility in how a Workspace may be organized and laid out on the screen.

A Workspace can contain any number and type of windows, including visualizations, other workspaces, and other objects such as text editors. In this sense, the Workspace acts like the "desktop" in a GUI operating system, except that there can be any number of them and they can be loaded and saved.

A novel interface technique is used to make arranging windows within a workspace easier. In most cases it is desirable to arrange a number of visualizations so that they do not overlap, but without wasting space. This is best achieved by having them (nearly) touch at edges. A uniform spacing between windows is also aesthetically pleasing. The "smooth snap" technique makes this easy to do this without extreme dexterity with the mouse, but without restricting the set of window placements.

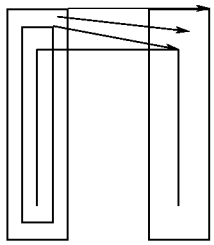

This technique makes use of a mapping between a "placement space" which is 1:1 with the movement of the mouse, and the screen space in which windows are arranged. A small box of pixels centered on a point or line the window snaps to is mapped to that point. A somewhat larger box centered on the same point or line is mapped to itself. Points in between are mapped linearly; each pixel of distance in placement space is two in screen space. Sketch lines are displayed between windows to help the user see where windows will snap.

A workspace is also responsible for integrating all the visualizations placed within it. Each visualization is controlled by two filters, "slice" and "benchmark", and provides a third filter "selection." In the preferred example embodiment, the following selection policy is used:

1. Each visualization's benchmark is the workspace benchmark; and
2. Each visualization's slice is the intersection of each other visualization's selection, and the workspace benchmark.

There is an efficient (O(N)) algorithm for computing this selection using bitfilters. Conceptually, this algorithm counts the number of visualizations selecting each row in the bitfilter table. It only needs to count to two, so it uses two bits rather than an integer per row:

```
filter one = slice; // 0 if at least one widget doesn't select it
filter two = slice; // 0 if at least two widgets don't select it
for(int v=0; v<visualizations.size( ); v++) {
two &= selections[v];
two |= one;
one &= selections[v];
}
one = ~one; // 1 if at least one widget doesn't select it
for(int v=0; v<visualizations.size( ); v++)
if (changing_vis!=v) {
filter s = selections[v];
s ^= one;
s &= two;
visualizations[v]->setSlice( s );
}
```

Alternatively, another O(N) algorithm is available that will work on algebraic filters or bitfilters:

```
static inline int parent(int x) { return (x−1)>>1; }
static inline int left(int x) { return x+x+1; }
static inline int right(int x) { return x+x+2; }
void updateSlices(int changing_vis) {
if (selections.size( ) <= 1) return;
int leaves = 1 << int( ceil( log(selections.size( )) / log(2) ) );
vector<filter> tree( leaves − 1 );
// see parent( ), left( ), right( ) functions for indexing
// Build bottom level of tree
for(int i=0; i<selections.size( ); i+=2) {
    if (i+1==selections.size( )) { // Second visualization doesn't exist
    tree[ parent(tree.size( ) + i) ] = selections[i];
    } else {
    tree[ parent(tree.size( ) + i) ] = selections[i] & selections[i+1];
    }
}
// Build other levels of tree
for(int i=parent(tree.size( )−1); i>0; i−−) {
tree[i] = tree[left(i)] & tree[right(i)];
}
// We've built all the intermediate results, now we have to traverse them
//   to generate the actual slices
int output = 0;
traverseSlice(tree, output, slice, 0);
assert (output == visualizations.size( ));
}
void traverseSlice(vector<filter>& tree, int& output, const filter& f,
int node) {
if (node >= tree.size( )) {
if (output < visualizations.size( ))
visualizations[output++]->setSlice(f);
} else {
int leftchild = left(node);
int rightchild = right(node);
if (rightchild < tree.size( ))
traverseSlice(tree, output, f & tree[rightchild], leftchild);
else
traverseSlice(tree, output, f & selections[rightchild-tree.size( )], leftchild);
if (leftchild < tree.size( ))
traverseSlice(tree, output, f & tree[leftchild], rightchild);
else
traverseSlice(tree, output, f & selections[leftchild-tree.size( )], rightchild);
}
}
```

Other selection policies are also possible. For example, a left-to-right selection policy could be used in an alternative embodiment of the Visual Workstation. In this alternative embodiment, the visualizations were arranged in a definite order in the interface. Each visualization's benchmark is the slice of the visualization to the left and each visualization's slice is the intersection of the slice and the selection of the visualization to the left.

Another alternative selection policy is to let the user construct an arbitrary Boolean expression out of visualizations; for example by editing a directed acyclic graph with visualizations as nodes and Boolean operators (and, or, not) as edges.

Workspaces may also serve other functions. For example, they may act as "rooms" in a collaboration environment. Two users opening the same workspace on different workstations may use it together (with selections and other changes to the workspace being mirrored over the network on the other user's Workstation.)

In addition, Workspaces "scope" selections of data. All of the visualizations in a workspace are updated by selections made through interacting with one or more visualizations in that workspace. More specifically, in Visual Workstation a selection or query is scoped by the workspace, and any selections made by pointing and clicking on the visualizations to identify points and ranges on the visualization that represent parameters to be added to the query or selection. When a selection is made Visual Workstation immediately finds the data that matches the query and updates the other visualizations in the workspace with that data. The visualizations that are in other workspaces on a Visual Workstation screen are not updated by interactive selections made of visualizations within another workspace. Workspaces can also be saved and re-opened later. All of the visualizations, selections, notes, annotations and other information depicted within a workspace may be saved and returned to later for continued monitoring, exploration and evaluation.

Template Workspaces are resident on the Visual Workstation and provide a convenient starting point for a user to create Workspaces. Template workspaces lay out all of the visualizations and instructions for using them to accomplish a certain business task. Template Workspaces that are updated by the user can be saved and returned to later or used as a Template themselves.

Workspaces can be communicated between users for collaborative decision making. A Workspace can be e-mailed to another user that has the same database and be opened by that user and worked on. This allows a user to point out a correlation, insight, problem, or otherwise that they discover when monitoring, exploring or evaluating their business processes, campaigns, customer or system performance in the case of Visual Site to their team.

2. Visualizations

All visualizations in Visual Workstation support a simple but powerful protocol that enables them to be used together with other visualizations. The first of these principal components of this interface is "filter getSelection(datatable& over)."

This function returns a filter describing the selection made by the user in the visualization. Every visualization provides a selection interface, which gives the user the ability to select some of the elements displayed by the visualization. The visualization uses the query engine to generate an appropriate filter from this selection and the given fact table.

The second principal component is "void setSlice(const filter& slice)." This function sets the slice of the visualization, a filter describing a subset of the data which is to be rendered by the visualization. The visualization may render only this data, or it may highlight this data so that it can be distinguished from data not in the slice.

The third function is "void setBenchmark(const filter& benchmark)." This function sets the benchmark of the visualization, a filter describing a set of data to be compared to the slice. A visualization may disregard the benchmark data, or it may render it in a way that can be compared with the slice data.

Visualizations also implement the drawable interface of the window system, so that they can be rendered as part of workspaces.

As discussed, the Visual Workstation provides an ever-expanding set of visualizations. Some of these can be and used with many different types of data, while others are specific to certain data as is well-known in the art.

1D Bar graphs
2D Bar graphs
1D Tables
Crosstabs
Line graphs
2D site maps
3D site maps
2D process conversion maps
Geographic maps
Session and click detail tables
3D terrain maps
Fish eye lists
Scatter/bubble plots
Directed graphs
Sales funnel visualization
Customer value pyramid visualization
Spaghetti plot
Surface maps
3D volume maps
3D scalar fields
3D vector fields
Page thumbnail sequences
Metric tables
Legends
Tree views Certain presentation techniques are used across a variety of visualizations such as benchmarks. Benchmarks are a presentation technique designed to permit comparison of the slice and benchmark data described above. Essentially, the benchmark data is treated like another series of data, and displayed accordingly, except that it is automatically rescaled to highlight differences in distribution rather than in scale between the slice and benchmark sets. It is preferable to use a consistent presentation for benchmarks to aid the user in recognizing them. The figures show various screenshots to demonstrate use of benchmarks in different visualizations.

Confidence intervals are another presentation technique used across a variety of visualizations. Confidence intervals are an intuitive way of expressing statistical uncertainty. When a poll result is quoted as 54%+/−3%, this is a confidence interval. Confidence intervals are easier to understand than hypothesis testing (i.e. P-values) and do not require the user to articulate a hypothesis to the program. Visual Workstation displays confidence intervals so as to protect the user from inadvertently accepting results that have low statistical validity. The figures show various screenshots to demonstrate use of confidence intervals in different visualizations.

Color ramp metrics are still another presentation technique used across a variety of visualizations. Extra metric information can be displayed across almost any visualization by mapping it to color values. Visual Workstation maintains color ramp metrics at the Workspace level. Color ramp metrics are enabled by adding a special "Color Legend" visualization to a Workspace, which provides control over which metric to use. It is preferable to assign different color ramps to different metrics, so that it is easier to tell even without looking at the legend, what data is being represented as what color. In addition, the user may interactively threshold the metric by selecting ranges on the color legend. The figures shown various screenshots to demonstrate use of color ramp metrics in different visualizations.

Another presentation technique used across a variety of visualizations is dynamic filtering. Dynamic filtering is used to display data at the highest resolution that is statistically significant, but not permit it to degenerate into noise (or an impulse train).

Selection is a technique used across a variety of visualizations. Most Workstation visualizations support a common selection interface. Clicking on an element (with the user input device such as a mouse) selects it and deselects others. Clicking and dragging selects a range of elements and deselects others. Holding down the CTRL key modifies these behaviors to be "union" (other elements are not deselected). Holding down the SHIFT key modifies these behaviors to be "difference" (the chosen elements are deselected instead of selected). Holding down the ALT key and dragging "slides" the selection in any direction while maintaining its shape and size.

3. Query Model

The query model provides an abstraction between visualizations and other ways of presenting or using data, and various ways that data may be stored and accessed. The key abstractions in the query model are dimensions, metrics, and filters.

As discussed above, a dimension represents a way of grouping data. Web log data, for example, can be grouped by month, by page, by visit, etc. Each "group" within a dimension is called an "element." For example, a "Month" dimension would have elements "January", "February", etc.

A dimension represents only a conceptual grouping; it may or may not have anything to do with the physical representation of the data. This is in contrast to cube systems, where the term "dimension" is used in a similar way but a particular set of dimensions are a property of the structure of a cube.

It is not required that each piece of data fall into a single element. For example, a single session in web data may touch many pages, and so would fall into multiple elements in the page dimension.

It is possible to take the Cartesian product of any two dimensions to yield a third dimension. The number of elements in the third dimension is the product of the number of elements in the two dimensions. The Cartesian product operation can be visualized as a two-dimensional bargraph.

A discussed, a filter represents a subset of data Filters support the Boolean (or set algebra) operations of union, intersection, and complementation. A filter may be represented algebraically, as an expression built up from subsets of dimension elements and boolean operations (e.g., Month=January and Hour=4:00]

A filter may also be represented as a subset of rows in a table. This is sometimes called a bitfilter, since one bit is used for each row in the table (if the bit is one, the row is in the filter; if it is zero, it is not). This representation is very useful for fast evaluations over that table. Boolean operations on such filters are also quick.

A metric represents a function or calculation, which can be evaluated over a dimension and filter. Evaluating a metric over a given dimension and filter returns a result set of one floating-point value per element in the dimension. A result set might be returned as a table of tuples (element, value) instead of an array of values if many of the values are expected to be zero.

Any function of scalar values can be applied to metrics instead to yield another metric. For example, if f(x,y,z) is a function of three variables, and A, B, and C are metrics, then D=f(A,B,C) is also a metric, and can be evaluated by evaluating A, B, and C, and applying f to each triple of elements in their result sets.

More specifically, arithmetic operators such as addition, subtraction, multiplication, and division can be applied to metrics just as to ordinary numbers. For example, a "conversion rate" metric can be defined as (Purchases/Visits), where Purchases and Visits are metrics already defined.

Another operator available over metrics is filtering, applying an extra filter to an existing metric. For example, Purchases could be defined as Visits[Revenue>0] (pronounced "Visits where Revenue is greater than 0").

The evaluation of a filtered metric is simply:
M1[F1].eval(dim, filter)=M1.eval(dim, F1&filter)
More generally, any Boolean operation might be applied to a filter rather than intersection.

Metrics in the query model also have properties such as a name and a format (a format is a function that turns a numerical result into a usefully formatted string). Metrics can cache the results of previous evaluations, returning cached results unless the dimension, filter, or metric has changed. Any well-known caching algorithm could be used to cache results.

The abstract operations provided by dimensions, metrics, and filters are insufficient by themselves, because they provide no access to data. Operations to create primitive dimensions, metrics, and optionally filters are provided by a query engine. Visual Workstation can support many query engines including cubes, A-D trees, adapters to access other OLAP systems, as well as others. These primitive dimensions and metrics are used to create more sophisticated dimensions and metrics, and to create filters. Primitive and compound dimensions and metrics are different only in their implementation as they appear indistinguishable to the user and no explicit differentiation is made between them in the code.

The 'opchains' Query Engine (an abbreviations for "Operation Chains") is a technique for multiple polymorphism that combines the advantages of "expression templates" (a well-known technique) with those of multiple dynamic dispatch techniques. Specifically, it permits the compiler to instantiate and optimize generic code for a particular situation (like expression templates), while allowing it to choose a code path at run-time (like dynamic dispatch). A sample algorithm is set forth in the Appendix.

This is possible because the compiler is caused to generate a large (but finite) number of different instances of the generic code, each optimized for a different case. It then chooses a code instance at run-time using dynamic dispatch. The compiler is induced to generate instances through a template metaprogramming technique.

In the preferred implementation, the set of items ("atoms") to be dispatched on form a linked list or "chain." This chain is built one atom at a time by the use of a function doubly dispatched on the type of the atom and the (arbitrarily complex) type of the chain:

```
struct opchain_base: refcounted {
// Atoms to be composed
virtual opchain_base* v_cons( struct op_node& a ) = 0;
virtual opchain_base* v_cons( struct op_node_distinct& a ) = 0;
virtual opchain_base* v_cons( struct op_link& a ) = 0;
virtual opchain_base* v_cons( struct op_link_distinct& a ) = 0;
virtual opchain_base* v_cons( struct op_columndim& atom ) = 0;
virtual opchain_base* v_cons( struct op_count& atom ) = 0;
virtual opchain_base* v_cons( struct op_sum& atom ) = 0;
virtual opchain_base* v_cons( struct op_bitfilter& a ) = 0;
virtual opchain_base* v_cons( struct op_makefilter& a ) = 0;
// Other members also...
};
Once built, a chain has a type such as
op< A1, op< A2, op< A3, nil> > >
where
A1, A2, A3 are the types of the atoms in the chain
template<> op<Atom,Chain> is a subclass of opchain_base
nil is a subclass of opchain_base
```

The implementation of v_cons makes a decision (which can be decided at compile time) whether to extend the type of the chain or fall back on a dynamic implementation. This decision controls the set of chains generated by the compiler. For example (in this implementation):

```
const bool use_dynamic =
T::dynamic ||
// Max 1 op_bitfilter, and it must be at the left
T::nFilters ||
// Exactly 1 metric in an expression
(X::nMetrics+T::nMetrics != 1) ||
// Dimensions must precede metrics
(X::nMetrics && T::nDims) ||
// Max # dimensions+metrics
(X::nDims+T::nDims+X::nMetrics+T::nMetrics > 3);
```

The op<Atom, Chain> template implements the operations to be composed by calling functions of atom templated on Chain. These functions can be inlined and statically optimized by the compiler, since they involve no dynamic dispatches or indirection.

Visual Workstation uses opchains to implement a query engine that works on data organized in tables with contiguous columns, supports several types of primitive dimensions including "column dimensions" represented by a column of integer keys mapping rows to dimension elements. Another type of primitive dimension supported includes "node dimensions" represented by an 'index' and a 'count' column of integers referencing spans of rows in a second table, a column of integer keys in the second table, and an array mapping these keys to dimension elements. Still another is "link dimensions" using the same representation as node dimensions, but mapping consecutive pairs of nodes to dimension elements instead of single nodes. In addition, alternative embodiments include modifications to support other types of dimensions which are represented over rows of a fact table.

Visual Workstation uses opchains to implement a query engine that supports several types of primitive metrics, including "count", which counts the number of rows in a table falling into each dimension element, and "sum", which sums the value of a given column over the rows falling into each dimension element. In addition, alternative embodiments include modifications to support other types of metrics, which operate over rows of a table.

Visual Workstation uses opchains to implement a query engine that can evaluate any combination of dimensions, metrics, and bitfilters and can generate bitfilters from a dimension and subset of elements.

The query engine uses several atomic operations including op_columndim, which implements column dimensions and op_node, and op_node_distinct, which implement node dimensions. op_node is used when the metrics being evaluated are in the secondary table and op_node_distinct is used when metrics are in the fact table. Others include op_link, and op_link_distinct, which are used to implement link dimensions; and op_count, which implements count metrics. Still other atomic operations include op_sum, which implements sum metrics over integer columns, op_bitfilter, which applies a bitfilter to the evaluation of metrics, and op_makefilter, which creates a bitfilter from a set of elements identified in a dimension.

The atomic operations used in the query engine contain additional architecture-specific optimizations such as, for example, cache warming and prefetching operations.

4. Data Model

Data is organized hierarchically into databases containing tables containing columns containing rows. Tables contain some operations on rows (such as copying one row over another), which are automatically replicated across all columns. All columns in a table always have the same number of rows.

Each column is represented as a contiguous array of homogenous type, with each element of the array containing the value of that column in one row. A column may contain elements of any type, but all of the elements in a column have the same type. This organization makes it very efficient to evaluate queries, which use only a few columns out of many.

The data stored in the data model may logically represent references between tables, such as that between a dimension column in a fact table and the corresponding column of strings naming the dimension elements, or the more complex relationship between the primary and secondary fact tables in a node dimension. However, these relationships are not explicit in the data model; they are understood only by the query engine. This means that operations at the data model level, such as the synchronization of databases across the network (transaction engine), need not be concerned with them.

5. Metric Spreadsheets

As explained above, metrics can be used like ordinary numbers in arithmetic expressions and functions. They can also support a variety of other useful operations such as filtering. It is therefore possible to create a spreadsheet which, in place of formulas involving numbers, contains formulas involving metrics. Each cell in such a spreadsheet may be blank, contain a label, contain an ordinary number, or contain a formula.

A formula in such a spreadsheet may reference named metrics from the query engine, may reference other cells, and may contain ordinary numbers. The result of any formula is a metric. Any metric can be evaluated over the null dimension to yield a number. This number may be displayed as the result of a formula in an ordinary spreadsheet would be displayed.

Selecting any cell (except a blank or label cell) in the spreadsheet yields a metric, which could be exported for use in any visualization or other client of the query engine. For example, one could graph any single cell over time.

Here is an example metric spreadsheet, showing formulas and labels:

|   | A | B | C |
|---|---|---|---|
| 1 | 'Search process' | ' | |
| 2 | 'Searches' | Visits[ Page = "/search.asp" ] | |
| 3 | 'Search results' | B2[ Page = "/search_results.asp" ] | B3/B2 |
| 4 | 'Resulting sales' | B3[ Revenue>0 ] | B4/B2 |
| 5 | 'Revenue from search' | Revenue[ Page= "/search.asp" and Page= "/search_results.asp" ] | B5/B2 | a. Here is the same spreadsheet showing values:

|   | A | B | C |
|---|---|---|---|
| 1 | Search process | | |
| 2 | Searches | 28,200 | |
| 3 | Search results | 18,500 | 84.1% |
| 4 | Resulting sales | 2,200 | 7.8% |
| 5 | Revenue from search | $77,000 | 2.73% |

Any of the cells containing a value could be used as a metric in other visualizations. For example, it might be very useful to see how revenue from search breaks down over time, over referring site, or other over dimensions.

The entire spreadsheet can easily be sliced by a given filter, simply by using the filter when metrics are evaluated to yield values that are displayed. This means it can support the visualization protocol described above and fit into workspaces as an ordinary visualization.

The usability of the spreadsheet could be further enhanced by providing automated functions for embedding tables over dimensions into the spreadsheet. For example, one could automatically insert a table into the spreadsheet giving Revenue from Search (B5) by Month.

6. What-If Analysis

Visual Workstation's "What-If" Analysis technology helps a user answer a wide variety of speculative questions such as:

1. "If 10,000 more people came to my site from yahoo.com, what would they do at my site?"

2. "Would they generate enough additional revenue to justify a $5000 marketing expenditure at Yahoo?"

3. "How much is improving the effectiveness of my product search process worth to me?"

4. "What would happen if twice as many people looked at the special of the month?"

The analysis of past data can reveal correlations which, preferably augmented with human common sense, are useful in making predictions. What-If Analysis helps to automate this process.

a. Assumptions

All predictions are based on assumptions. What-If Analysis makes a single, broad assumption, which is referred as the uniformity assumption. In statistical language, this might be articulated as follows: All the records in any identifiable group are sampled randomly from the same population.

This means, for example, that if 45% of the mugworts in the database are feep, then 45% of all mugworts, or at least all the mugworts that can ever be in the database, are feep.

The uniformity assumption is not always correct. Consider questions one and two above. It may be that the people sent to the site by a marketing campaign at Yahoo will not be at all similar to the people who have visited the site from yahoo in the past, and there is no way for the program to know. The calculations made by What-If Analysis are only absolutely correct if both the past visitors from Yahoo and the visitors generated by the marketing campaign are chosen at random from the same set of yahoo's customers.

It is also important to realize that What-If Analysis does not distinguish correlation from causation. For example, there is a strong correlation between smoking and lung cancer. Consider this question:

"If there were 10% more cases of lung cancer, how many smokers would there be?"

What-If Analysis would examine a suitable database and report that there would be an increase in smoking, since lung cancer cases are more likely to be smokers than the general population. This is, depending on how you look at it, a misleading conclusion: lung cancer doesn't cause smoking.

A simple way to think about this is that, given a what-if scenario, What-If Analysis calculates both the likely causes and effects of that scenario, but it is up to the user to distinguish one from the other.

b. Simple What-If Calculations

Consider question two above. Suppose it desired to answer this question by hand. One might reason as follows:

To date, 4000 people have been referred from Yahoo

The 4000 visitors generated $1000 in revenue

Each visitor, on average, generated $1000/4000=$0.25 in revenue

Since one assumes the 4000 previous visitors and the 10,000 hypothetical visitors are drawn from the same population, one expects each of the 10,000 visitors to generate $0.25 as well 10,000 visitors will generate an additional $0.25*10000=$2500 in revenue Thus, a $5000 investment is not justified Note the importance of the uniformity assumption in this reasoning. Also note that if no one had ever been referred from Yahoo in the past, there would be no data on which to base this calculation.

The calculations used by Visual Workstation to perform the What-If Analysis are equivalent to those above, but they do not proceed in the same way. The method actually used generalizes better, requires less semantic understanding of the data, and is very efficient even for complex scenarios.

c. Scenario Model

Visual Workstation visualizations permit the user to describe a What-If scenario interactively in a variety of ways. For the purposes of analysis, these scenarios are represented as a collection of "hypotheticals" each having the form (X,G), where X is a number and G is a group. Each hypothesizes (X−1)*100% more records in group G. The scenario in the above example would be represented by a single hypothetical (3.5, [Referrer=yahoo.com])

because in that scenario 14000/4000=3.5 times as many people came to the site from yahoo.com.

d. Record Weights

From the above scenario model, it is simple to compute a "weight" associated with each record. Initially all sessions have weight 1.0; each hypothetical (X,G) multiplies the weight of the sessions in G by X. Put another way, the weight of a session S under scenario H is defined as the set product $\Pi\{X|(X,G) \in H$ and $S \in G\}$ From these weights W it is in turn possible to compute metrics such as counts and sums under the scenario, by replacing metrics as follows:

count→sum(W)

sum(C)→sum(W*C)=dot-product(W,C)

These can be efficiently evaluated by the Visual Workstation query engine. Count metrics become simple sum metrics, and sum metrics become dot products or sums of derived columns already multiplied by session weights.

e. Incremental Hypothesis Changes

In support of Visual Workstation's highly interactive user interface, it is important to be able to adjust just one hypothetical out of several and immediately recalculate the session weights. An operation is define:

changeWhatIfWeights(X1, X2, G)

which is defined to replace the hypothetical (X1,G) with the hypothetical (X2,G). The former must already be present in the scenario, unless X1=1.0.

The obvious implementation of this operation would be to multiply the weights of all the records in G by X2/X1. Unfortunately, because of the limited precision of machine arithmetic, a large number of such operations applied successively will not be reversible—it will be impossible to return exactly to the "null scenario" where all weights are 1.0.

This problem is currently solved by Visual Workstation by replacing multiplication and division with addition and subtraction of integral logarithms of weights, base 1.01. Since the numbers being added and subtracted are integers, commutativity is preserved and it is always possible to get back to the null scenario.

7. Dashboard

A Dashboard is an interface construct developed into Visual Workstation. A Dashboard, is essentially a Workspace that allows real-time monitoring of multiple visualizations, metrics and dimensions to be organized into one larger window that is constantly updated with the latest information to depict progress toward key success factors. Dashboards allow managers, consultants and executives to monitor their business processes, campaigns, customer relationships and general site performance on a minute to minute basis.

Dashboards require no user interaction and allow for passive monitoring of critical business information. A default dashboard can be displayed automatically when a user is not actively working with a client application, to allow for the ongoing oversight of the business.

Dashboards can be saved and re-opened later. All of the visualizations, selections, metrics, notes, annotations and other information depicted within a dashboard may be saved and returned to later for continued monitoring, either when selected or when other activity stops for a period of time.

Template Dashboards provide a convenient starting point for a user to create custom Dashboards. Template dashboards lay out metrics, data dimensions, visualizations and instructions for what users might watch to understand their incremental progress toward key success factors. Template dashboards that are updated by the user can be saved and returned to later or used as a Template themselves.

Dashboards can be communicated between users for collaborative decision making. A dashboard can be e-mailed to another user that has the same database and be opened by that user for monitoring, this allows a user to point out a correlation, insight, problem, or otherwise that they discover when monitoring their business processes, campaigns, customer or system performance in the case of Visual Site to their team.

Printing visualizations is currently enabled by using screen shot-like capabilities. Data from visualizations can be printed by exporting it to Microsoft Excel, which is included with Visual Workstation.

A saved workspace or visualization can be sent to another user of Visual Site via e-mail as long as they have the same site database updating on their Visual Workstation. The data behind most visualizations can be exported to Microsoft Excel to be printed in numerical report formats or for other analysis.

8. Site and Process Maps

Site and process maps are used to display the session traffic, conversion rate, and potentially other metrics at each of a number of "nodes" (each a set of pages) and at each "link" between two nodes.

Maps can be created which (for example) display traffic over individual pages in a particular process, display traffic over the different sections of a site, or display traffic over the different subsections in a site section, by using different sets of pages to define nodes. In Visual Workstation, maps can be edited by the user using the following operations:

Drag and drop allows the user to position nodes on a map, and to add nodes to the map by dragging them from a hierarchical display of the available pages A node containing multiple pages can be expanded to one node for each page Two or more nodes can be collapsed to a single node containing the union of the pages in each Maps can also be created by using a metric to determine the position of a node in one or more dimensions. For example, a "Process Conversion Map" positions each of its nodes at a horizontal position determined by the conversion rate from that node to the end of the process. A node with 100% conversion is positioned at the right of the map, and a node with 0% conversion is positioned at the left. The vertical position of the node is determined by the user.

Once the set of nodes is determined, the program calculates the value of each metric for each node, and for each ordered pair of nodes (each link). For example, for each node the program calculates how many sessions visited any page in that node. For each ordered pair (n1, n2) of nodes, the program calculates how many sessions navigated from a page in n1 to a page in n2 without visiting any other page in any node of the map. Using the Visual Workstation query model, all of this is done by evaluating each metric (Sessions, Conversion) over a single "link dimension" having one element for each node and one element for each ordered pair of nodes. This evaluation is always filtered by the "slice" filter assigned to the visualization by the workspace.

The metrics for each node are rendered by modifying the representation of that node. For example, in Visual Workstation's 3D maps, the metric Sessions is typically displayed as the height of a 3D bar (box) rising from the position of the node on a 2D plane. In 2D maps, the same metric is typically displayed as the area of a circle rendered at the position of the node. The metrics for each ordered pair of nodes are displayed using a representation stretching between the representations of the nodes in question. For example, in 3D maps, the metric Sessions is typically displayed as the cross sectional area of a "pipe" arching between the first and second nodes in the pair. In 2D maps, the same metric is typically displayed as the thickness and brightness of an arrow pointing from the first to the second node. In both 2D and 3D maps, Conversion or another metric is typically displayed by coloring each node's and each link's representation according to a legend mapping values to colors. (For example, a conversion of 0 might be drawn in yellow and a conversion of 1 in green, with intermediate values of conversion being indicated by colors intermediate between yellow and green). Additionally, metric values can be labeled textually over nodes and/or links.

9. Value Model

Visual Workstation enables the user to analyze the value of pages, processes, marketing campaigns, and other entities in dollars even when a web site generates value indirectly through cost savings or offline transactions. The user of the software can identify actions on the site which generate value, and calculate the average value generated by a transaction of each type (for example, the user might assign a value of $50 each time a visitor uses a feature on the web site for finding an offline store, based on the marketing budget for bringing new visitors to the store). The user then specifies the url or urls corresponding to this transaction by dragging pages from a hierarchical display of pages into the "Value Model" visualization, and then enters the value ($50 in this case) assigned to the transaction.

The user can also quickly select a subset of the defined value events to make up the value model at any given moment. This makes it easy to analyze specific sources of value, or to view the data without a specific source of value.

Visual Workstation then defines a metric, Value, as the total of the assigned value of all the distinct selected value events that occurred in each session. This metric can be evaluated as a sum over the value of each session, where the value of each session is calculated in advance from the value model provided by the user. These values can be updated quickly by iterating over the distinct selected value events that occur in each session and summing their value.

Visual Workstation also defines a metric, Value Events, as the number of sessions in which any selected value event occurs. This can be implemented by a filtered count of sessions (for example, sessions where Value is nonzero).

Visual Workstation also defines a metric, Conversion, as Value Events/Sessions, where "Sessions" is a metric counting the number of sessions. Conversion is expressed as a percentage (e.g. 13.2% of sessions had at least one value event).

10. Path Browser

Like a site map, path browser analyzes traffic and other metrics over a set of nodes (each one or more pages). The set of nodes also includes an "entry" node, which contains no pages but is considered to be visited just before the first page visited in a session, and an "exit" node, which contains no pages but is considered to be visited just after the last page visited in a session.

The path browser displays a currently selected "path" consisting of an ordered list of one or more (not necessarily distinct) nodes. This path is represented using a representation for each node (such as a text label, an icon, etc), with each consecutive pair of nodes connected by a representation of a link, such as a line or arrow.

The sessions which visited each of the nodes in the path in sequence, without visiting any node not in the path in between two of the nodes in the path, are considered the sessions selected by the visualization. In Visual Workstation, the visualization makes this set of sessions available to the workspace as its selection filter.

Unless the first node in the path is the "entry" node, which is not preceded by anything in a session, each occurrence of the selected path in a session will have a "previous" node: the last node that occurs in the session before the occurrence of the path. The program calculates the number of occurrences for each previous node, and may calculate other metrics over the set of occurrences or sessions. The set of nodes is sorted by the number of occurrences of each as a previous node, and the top N such nodes are displayed. Typically the previous nodes are represented in a manner similar to the way the nodes in the currently selected path are represented, except that since they are alternative rather than sequentially visited nodes they should preferably be displayed at intervals orthogonal to the intervals between nodes in the selected path. For example, if the selected path is displayed horizontally, with earlier nodes in the sequence to the left and later nodes to the right, the most frequent previous nodes might be displayed to the left of the leftmost node in the sequence, with the most frequent node at the top, the next most frequent node below it, and the least frequent node at the bottom.

The next node is displayed in a similar fashion. Unless the next node in the selected path, which is never followed by anything in a session, each occurrence of the selected path will have a next node: the first node that occurs in the session after the occurrence of the path. The program calculates the number of occurrences for each next node, and may calculate other metrics over the set of occurrences or sessions. The set of nodes is sorted by the number of occurrences of each as a next node, and the top N such nodes are displayed. If the selected path is displayed horizontally, with earlier nodes in the sequence to the left and later nodes to the right, the most frequent next nodes might be displayed to the right of the rightmost node in the sequence, with the most frequent node at the top, the next most frequent node below it, and the least frequent node at the bottom.

A link representation similar to the links between consecutive nodes in the path may be used to connect the first node in the path to each of the previous nodes, and the last node in the path to each of the next nodes.

The program may display metrics for each previous and each next node. For example, it might display the number of occurrences of each as a previous or next node, or the fraction of occurrences of the path in which each occurs. It may also display metrics for the selected path as a whole.

To actually calculate the numbers of occurrences for each previous or next node, the program may use a path dimension having one element for every possible path (every possible list of nodes—this is an infinite number of elements). A derived dimension may be created from such a dimension (by taking a subset of elements) having one element for every possible path which consists of any single node followed by the currently selected path (which is also one element for each node, so this is a finite number of elements). Evaluating a metric over such a dimension yields the value of the metric for each previous node.

Similarly, evaluating a metric over a dimension having one element for each possible path which consists of the selected path followed by a single node yields the value of that metric for each next node.

Alternatively, metrics such as the "number of occurrences" metric may be evaluated directly from a list of pages visited in each sessions. First the list of pages is transformed to a list of nodes visited in each session using the definition of the set of pages for each node. Then, for each session, the list of nodes is searched for a sublist equal to the currently selected path (using any string search algorithm). The number of occurrences, the number of occurrences for each previous node, and the number of occurrences for each subsequent node can then be counted directly from the set of occurrences found by the string search.

These steps may all be performed in one pass over the list of pages visited, by looking up each page in a table to yield the corresponding node as the list is traversed by the search algorithm.

The user should be enabled to interactively edit the list of nodes in the path. An easy way for the user to add nodes to either end of the path is to select one of the previous or next nodes (for example, by clicking it with the mouse). If the user selects a previous node, the program can insert this node at the beginning of the list of selected nodes. If the user selects a next node, the program inserts that node at the end of the list of selected nodes. The user must also be able to remove a node from the list if more than one node is present (leaving the order of the other nodes unchanged). The user should also be able to add arbitrary nodes to the list (for example, by choosing them from a list of all nodes, or dragging them from elsewhere in the interface). Whenever any change is made to the selected path, all of the calculations and displays above must be updated to take into account the change.

A path browser needs to be initialized with a currently selected path of at least one node. This node can be the entry node (in order to show the behavior of visitors beginning with their arrival at the site), it can be the exit node (in order to show the behavior of visitors before they leave the site), or it can be another node selected by the user from another visualization such as a site map or list of pages.

III. Operation of System Components

A. Visual Sensor

Visual Sensor, which is comprised of a plurality of software modules being run on (or in communication with) the web server, collects information about each click from web users accessing the web site. For IIS, the collection mechanism used is an ISAPI filter. For Apache, it is a dynamically loaded module. Identical information is collected on each platform by Visual Sensor's Logging process and placed in a circular disk queue.

In the present example embodiment, when a user clicks a URL in a web browser the request is transmitted to the web server. The web server reads the request and processes it by serving back pages, static or dynamic. When that request is registered by the web server, Visual Sensor's Logging process capture the requests, stores it and a circular queue, and Visual Sensor's TXLog process transmits the request to the Visual Server.

The following are examples of two sets log data that might be stored by the Visual Sensor.

Example 1

CLogEntry Dump:
Status: 200
TrackingFlags: 1
TrackingID: 4306072366534025577
ServerTime: Mon Oct 08 20:00:00 2001
URI Stem: /Default.asp
URI Query:
Client Host: 63.78.56.226
Server Host: 172.16.0.20
Referrer:
Cookie:
User Agent: WhatsUp_Gold/6.0

Example 2

```
CLogEntry Dump:
Status: 200
TrackingFlags: 0
TrackingID: 4306065223016891024
ServerTime: Mon Oct 08 20:00:00 2001
URI Stem: /direct.asp
URI Query: idpage=bnk
Client Host: 64.210.241.103
Server Host: www.everbank.com
Referrer: http://www.everbank.com/v24topnav.asp?IdPage=pro_bill_t1
Cookie:
eb=firstVisit=no&IDBranch=1&ReferID=1307&IDAffGroup=1&ccs=
1&repID=&IDAff=1&bFreeSourceID=
003790079645592821 66&IDAffAlias=eb&version=
v24; ASPSESSIONIDQQGGGWSO=
KLIHDONDMHIMPAHPMBLENAJN;
v1st=3BC237817D95C290
User Agent: Mozilla/4.0 (compatible; MSIE 5.5; MSNIA; Windows 98;
Win 9x 4.90)
```

Most of the information in the above examples of log data is convention log data and, therefore, not repeated here. Further examples of log data are provided in the Appendix.

The circular queue is a fixed size file on disk that is, logically, a circular list that wraps around on itself and overwrites itself when full. More specifically, after data about the click is collected it is pushed onto the back of the circular queue stored on disk. The queue uses a fixed amount of disk space with each new entry being placed at the end of free space. When the end of free space is reached, it wraps around and the next entry is placed at the beginning of the queue. This is important because it prevents unbounded growth of the queue. It is important the Visual Sensor be unobtrusive and cause no difficulty for the web server. A disk queue that has the potential to grow without bounds could use all free disk space and bring down the web server. Another advantage of the fixed size is that there is never any need to acquire and release free storage space. This acquire/release cycle that is typical of queues and lists can be the most computationally expensive aspect of the program.

This queue also requires no synchronization between a writer and reader. Usually, when there is a writer and reader of a common piece of shared storage there is inefficient synchronization that must occur between the two processes to insure that the writer does not overwrite data that has not been read and that the reader does not read data that is incomplete. This synchronization typically involves one process sitting idle until the other has completed its task. The disk queue of the present invention does not require this inefficiency.

The web server and Visual Sensor are done with the data after it has been pushed onto the queue. Next, the click data is ready to be picked up by the TXLog process that will transmit it to the Visual Server for permanent storage and analysis. The TXLog process pulls entries from the queue, wraps them up as an SSL encrypted HTTP request, and sends them over the network to the Visual Server.

The TXLog process constantly looks for data in the memory mapped file that stores the logged data (collected from web server by the Logging Process) and if there is any, makes a request of Visual Server and sends the data to the Visual Server. The TXLog process attempts to send 8 Kbyte packets, although if there is more data to be sent, it sends larger packets. The TXLog process can be throttled as an overall process to limit the amount of bandwidth when transmitting data to the Visual Server. This TXLog process is completely independent of the web server and continuously monitors the queue for new entries. In addition, the TXLog process can transmit data placed there by any cooperating process.

As discussed, the ISAPI filter for IIS and module for Apache use different mechanisms but log the same data. In addition to logging data, each places a cookie, as is well-known in the art, on the customer's computer system (customer refers to the visitor accessing the web site) so that customer will be recognized in the future. In the present example embodiment, the cookie stores an identifier that uniquely identifies the customer's computer and, in some alternative implementations, identifies the computer being used by the customer.

Visual Sensor also provides a mechanism that allows the web developer to submit user specific data for analysis. This data may be static or dynamically generated by the processing logic on the web page. However, there are limited facilities available for communicating between the logic of a web page and our web server hooks for logging. In one embodiment, a custom object or service allows submission of additional logging information. There are, however, a number of drawbacks with approach. First, the web developer's must learn and use yet another interface. Second, the approach requires additional installation and configuration procedures. Third, the process can only be invoked in a script and there is no way to statically log information through links or Universal Resource Locator's (URL's).

The preferred approach is to permit add logging data to the URL query string. As is well-known in the art, the query string is the string of name/value pairs that is after the "?" in a URL (i.e., http://www.foo.com/mypage.asp?firstname=dylan&lastname=ginsburg). The web developer uses the facilities of the web development environment to add additional name/value pairs to the query string. This avoids the problems associated with the first approach discussed above. Specifically, the first and second problems are avoided because this solution requires no additional software other than what is already available in the web development environment. In addition, the approach provides a consistent solution to third problem because it allows information to be added to the query string dynamically from page processing logic as well as allowing data to be collected from static links.

In operation, when data is sent to the Visual Server the query strings following the ? in the URL are parsed and separated into <Name=Value> pairs or tuples. Each unique combination of query strings names and values along with the base URL can be considered a separate page by Visual Site. In the majority of cases a relatively small number of these combinations may actual be pages in the site. These dynamic pages can be treated as unique logical pages for analysis in Visual Site and can be collapsed together or expanded into different logical groupings.

This ability to capture user specific data through the normal process facilitates providing actionable business intelligence to the user in almost any specific area. For instance, zip codes data could be added to the log data (provided the customer's zip code was provided by the customer). The name of a page that is dynamically generated could be added. The amount of a purchase could be stored in the log file. The items referenced on pages that a visitor viewed or added to their shopping carts could be stored. This data is not normally available through logs. However, once stored, subsequent processing would permit removing this data from the logs and adding it to the dimensions kept in the database or performing whatever other processing is desired by the user.

One example of capturing user specific data will now be described for the Microsoft IIS platform. Microsoft's ASP platform permits the use of the "Response.AppendToLog" command, which modifies a query string transmitted by a browser as is well-known to those skilled in the art. As discussed, Visual Sensor captures the query string, and logs the name/value pairs in the URI Query field for subsequent transmission to Visual Server, which parses and filters the query strings.

The following is an example implementation of a method of capturing user specific data as described above for ASP pages. The following code is placed at the top of an ASP page (or anywhere in the page if buffering is enabled, which is the default for IIS):

<% Response.AppendToLog "page=" & Server.URLEncode(page_name) %> where "page_name" is a variable containing the name of the actual page being served. Response.AppendToLog actually appends information to the query string that is used for logging. Preferably, the file.asp page always receives POSTs so that the query string is always initially empty.

To capture product information by appending product identifying information to the end of the URL, the following code is added for each product on the first page of the purchase process after the user checks which products they want:

<% Response.AppendToLog "&select_prod=" & Server.URLEncode(product) %> where "product" is the name or other identifying information of the product that the user has selected for purchase, but for which the purchase process has not yet been completed.

In addition, it is preferable on the checkout page to add similar code, but with a different variable name such as:

<% Response.AppendToLog "&purchase_prod=" & Server.URLEncode(product) %>

By capturing the "selected" product and the "purchased" product, it is easy to compute and collect data relating to products that were selected, but were not purchased by the customer.

To capture zip code data, the following code should be added to the appropriate appwizard process:

Response.AppendToLog "&zipcode=" & Server.URLEncode(zipcode)

The techniques used for permanent logging of the data in the present embodiment are well-known in the art and are, therefore, not repeated here. The communication link employed between the Visual Sensor and the Visual Server in this embodiment is the well-known HTTP protocol and, therefore, is not detailed here. The HTTP protocol is used to frame the present embodiment's internal data transmission format. HTTP is most commonly used to send HTML text that is rendered by a browser. However, the HTTP protocol is flexible enough to serve as a frame for any arbitrary data. There are several benefits realized by using HTTP instead of a proprietary protocol, which could be used in an alternative embodiment. First, HTTP protocol is firewall and proxy friendly. Second, the Visual Server is a web server that can communicate with a browser for data collection. This means that, if necessary, the Visual Server could communicate directly with the customers' web browsers via HTML image tags or cookies. In addition, if necessary, an agent could be put on the customer's computer that will communicate with the Visual Server using HTTP and standard ports. Third, HTTP protocol permits easier interoperability with other systems. Future applications that wish to submit to or receive data from the Visual Server should be easier to implement since HTTP is a ubiquitous protocol. Web browsers can be served directly allowing for a thin client. SOAP and XML are easily integrated to allow the present embodiment to present a standard Web Service interface for accepting data.

What makes this architecture atypical is the inherent fault tolerance provided by it's disconnected and loosely coupled nature. The system is comprised of a series of collection points separated by persistent disk storage (the Visual Sensor disk queue, the Visual Server database, and the Visual Workstation database). Each process can be ignorant of the other and only cares that it can pick up data from a known location on disk. This architecture prevents permanent damage and loss of data is lost should a component go down or the network link is unavailable.

As discussed above, the Visual Sensor may take on additional system roles such as rewriting URLs or implementing an experiment on the HTTP server. To accomplish either of these tasks, the Visual Sensor first takes a URL that is requested by a browser of the site and replaces that URL with a different URL that is then process by the web server. For example, if a customer requests home page version one, Visual Sensor could give the web server the URL for a different home page—home page version two—to process for the browser. Visual Sensor can provide a different URL for any percentage of requests for a page (for example, providing a different URL every third request for a particular URL). Regularly providing an alternative URL after every a fixed number of requests for page (e.g., 3), allows the user to test a new page on a limited number of customers to determine if the new page performs statistically better than the existing page.

Through this periodic substitution process (substituting an alternative URL every X pages), Visual Sensor permits the user to experiment with new pages to refine and improve the automated processes. In addition, this periodic substitution process may be repeated for multiple pages that are a part of a customer's session. For example, the periodic substitution process would allow the user to test Checkout Process number two (which includes multiple web pages) to see if it performs statistically better than Checkout Process number one. By allowing users to test a new process, (e.g., showing it to one of every 1000 visitors) the user can determine if the tested process performs better than the existing process(es).

In one method of performing the periodic substitution process, each customer is assigned to a different experimental group (e.g., the test process group or existing process group) at random, using given weights for what percentage of visitors fall in each group. Each customer stays in the same group for each experiment, but is assigned independently to different experiments. Capturing this information in the log is accomplished by hashing the visitor ID together with the experiment ID to get a pseudo-random number, which is then compared against the percentage weights.

As discussed above, the Visual Sensor of the present example embodiment captures data from a web server. However, rather than taking log data from a web server, the Visual Sensor could take log data from a telecommunications switch, a network router, a database, an application's logging facility or other source by customizing the collection element of the Visual Sensor for that other data source. The other functionality of the sensor including the ability to queue and transmit securely the data remain largely unchanged structurally, although different data would be collected, stored, and transmitted.

B. Visual Server

The Visual Server is an HTTP server that logs clicks sent by the Visual Sensor as well as any other HTTP requests of interest. These log entries are picked up asynchronously by a Processing Server that statistically samples the data and transforms it into a form palatable for the Workstation.

Visual Server receives the data that is being transmitted to it by each Visual Sensor that is installed. Visual Server receives the data, combines it chronologically with the data from other Visual Sensors, then stores it off to disk in the form of compressed files and continues to use it for real-time data processing. The compressed files are stored to disk by date and named so that they can be easily re-used. The files can be exported to standard log file formats that might be used by other applications. Periodically the files that are stored on Visual Server are backed up to tape or long-term network storage.

1. Log Sources

The processing service is configured to read a sequence of log files. Thus, with two web servers, two sequences of files would be generated by the Visual Sensors and Server Receiver.

The Server Receiver is a proprietary HTTPS server, which is a part of Visual Server. Visual Sensor transmits data to the Visual Server by making a request of the HTTPS server and transmitting data along with that request. It can be located at a customer location or otherwise. It requires network accessibility, but it could be anywhere on the Internet as long as enough bandwidth is available.

The two sequence files would look like this:

| | |
|---|---|
| 20010818-24.168.212.55.log | 20010818-24.168.212.57.log |
| 20010819-24.168.212.55.log | 20010819-24.168.212.57.log |
| 20010820-24.168.212.55.log | 20010820-24.168.212.57.log |

The Processing Server is configured with a list of filename masks. Using the example above the following entries would be found in the config.vsc file:

```
SequenceMask=-24.168.212.55.log
SequenceMask=-24.168.212.57.log
```

Each sequence of files is treated as a source and there is always at least one source corresponding to at least one web server. In the case of multiple sources, clicks are popped off of each source in chronological order across all sources. That is, assuming clicks c1, c2, c3, and c4 are in chronological order, and that c1 and c3 are in source 1 and c2 and c4 are in source 2, the clicks will be processed in the correct order of c1, c2, c3, and c4 through processing by an algorithm.

2. Click Processing

The Visual Server processes each click by discarding HTTP error clicks or saving save them (depending on if they are listed as needing to be saved in the configuration files). Next, the click is checked against a (configurable) list of robot user agents (crawler, sitemonitor, etc). If the click is recognized as that of a robot based on a table of definitions of such parties in the configuration files, then it is discarded. Next, clicks corresponding to particular URL paths, which have been specified in the configuration file, are discarded.

Next, the click is first checked to see if it is a new (first time) visitor to this site by looking at the new visitor tag generated by the Visual Sensor, which determines if it is a new visitor based on whether or not the cookie matches a cookie previously received.

If the visitor is a new visitor, the actual number of visitors that have visited the site is incremented. In addition, if the visitor was a new visitor, then statistical sampling occurs.

If the sample is not full (as specified by a size limit based on the number of visitors in the configuration file) the sampling process adds the click data to the sample database. If the sample is full it executes, a statistical random sampling algorithm is executed to determine whether or not to replace an existing entry in the sample with that visitor data.

Once a sample is full, the chance that any new visitor click gets put into the sample is the same as any other new visitor click. A new visitor click that is put into the sample replaces a random one that was already in the sample, in this case. The number of visitors in the sample is configurable in the configuration file (as is shown in the sample below).

If the click is a returning visitor, then the sample is checked to see if this visitor is in the sample yet. If the returning visitor is already in the sample, then this click is added to the sample. If the returning visitor is not already in the sample, the click is discarded.

Next, the click is sessionized so that if the visitor does not have an already and existing visitor session in progress, then the process create a new visitor session. If a new session is created, then the process parses the referrer and creates a transaction that updates the referrer dimension. If a visitor session does already exist for the visitor, then the process determines if the received click data belongs to that session by looking at the time difference between the received click data and the last click (the duration for the time between clicks to be in the same session is defined in a configuration file entry) by that visitor and by checking to see if the referrer of the click is an internal (to the site) referrer.

Next, the URL that the user clicked is parsed out to build the page dimension. If the page already exists in the page dimension then the process references that page to the click and if the page does not already exists in the page dimension, then the process creates a transaction that adds that page to the page dimension.

When parsing the URL and the query string that is included in the URL, the process determines whether any name=value pairs in the query string were present where the name matches a name defined in our configuration file. If one is found that matches, the process determines if that value already exists in the target dimension as defined by the name and the configuration file. If that value exists in the target dimension, then the process gets the key to the element in the dimension. If that value does not exist in the target dimension, then the process creates a transaction to add the value to the target dimension in the database. If the element has already been bound to the target dimension at a session level then nothing need be done. If the element has not been bound to the target dimension, the process creates a transaction that binds the click to that dimension.

a. Sampling

Data collected from web servers is very significant in size, for instance, if a site served one million (1,000,000) page requests a day over 3 Gigabytes of data would be collected, over a year's time that would mount to over 1 Terabyte of data. The multiple gigabytes and terabytes of data in an operational database are expensive, both from the financial point of view and from the system point of view. An operational database that could store and search that amount of data would cost in the millions of dollars. Even if companies chose to make such expenditure, searches against that data would take minutes if not hours to run, making it impossible for data consumers to rapidly explore the data they have collected, or do any significant analysis on it without letting a query run for hours and then produce its result. The present invention permits analysis of these large amounts of data where the laws of physics and the state of database, system and network technology will not presently allow. In fact, the present invention permits users to analyze these vast amounts of data interactively, in real-time.

This problem (the management of terabytes of web data) is solved by building a random sample of the entire population of visitors that visit the web site and incrementally updating that random sample over time. The main idea behind the statistical inference enabled by sampling is to take a random sample from the entire population of visitors to the site and then to use the information from the random sample to make inferences about particular population characteristics such as the mean (measure of central tendency), the standard deviation (measure of spread) or the proportion of units in the population that have a certain characteristic. Sampling saves money, time, and effort. Additionally, a sample can, in some cases, provide as much or more accuracy than a corresponding study that would attempt to investigate an entire population-careful collection of data from a sample will often provide better information than a less careful study that tries to look at the whole population. In general, the larger the sample is in relation to the overall population, the higher the probability that a selection of the sample or a calculation based on the sample would correspond to that selection of calculation done against the entire population. The typical sample size used by the Visual Site application is one million visitors, including all of their sessions, and activities. For some sites this is a very large sample and for others, just a large sample.

Because a sample examines only part of a population, the sample mean will not exactly equal the corresponding mean of the population. Thus, an important consideration is the degree to which sample estimates will agree with the corresponding population characteristic. Understand that estimates are expected to differ from the population characteristics that are trying to be estimated, but that the properties of sampling distributions allow quantification, probabilistically, of how they will differ. In other words, the sample or subsample used to infer information about the entire population is slightly less accurate than a count of the entire population would be and the probability that a sample's inference is a correct representation of the whole population falls within a known probability range. When very small selections are made of the sample, the probability that they will correspond to the entire populations decreases, In the present invention, users are informed about where the sample lacks statistical confidence by a "Confidence Interval" display provided on the Visual Workstation, which lets users know were they should lack confidence in the results they are shown.

The following example illustrates the potential error factors or "accuracy" of the statistical sampling techniques used:
1. For the purposes of this example, assume that the size of the random Sample of visitors is fixed at 1,000,000 (N) of the total visitor population of site which is at up to this time, 100,000,000 or (V);
2. Assume that the user of the application Site selects 100,000 (X) visitors in the sample or (10%) of the sample's visitors to analyze or view by clicking on visualizations;
3. Sampling allows one to multiply (X) by (V/N) or 100 to infer the number of visitors (Y) or 10,000,000 in the overall population that have selection criteria equivalent to (X) in the sample;
4. Given these assumptions, there would be a 95% chance that the 10,000,000 visitors (Y) selected through the sample as (X) and multiplied by (V/N) or 100 to infer into the total population of visitors, are representative of between 99.4% and 100.6% of (XV), or the Actual Set of Visitors in entire population that meet the criteria of selection (X).
5. Further, selections of visitors of the following sizes, and the inferences based on that sample about the overall population would have the below listed potential percentage errors and accuracies in relation to the actual entire population:

| Visitor Population of Site (V) | Sample Size Used By Visual Site (N) | Percentage of the Visual Site Sample Selected by User of Visual Site (P) | Selected Set of Visitors Represented in Sample (X) | The Inferred Set of Visitors Based on Selected Set in Sample (X), if Visitor Population is (V) is (Y) | There is a 95% Chance That the Error in This Inference (Y) is Less Than + or − this (%), and | There is a 95% Change That The Distinct Set of Visitors (XV) in Population (V) that are Inferred by Selection Set (X), is in this percentage range of the Number of Visitors Inferred From the Sample as (Y), or | | There is a 95% Chance That The Distinct Set of Visitors (XV) in Population V that are Inferred by Selection Se (X), as (Y), is Between These Absolute Number | |
|---|---|---|---|---|---|---|---|---|---|
| 100,000,000 | 1,000,000 | 100.000% | 1,000,000 | 100,000,000 | 0.00% | 100.0% | 100.0% | 100,000,000 | 100,000,000 |
| 100,000,000 | 1,000,000 | 50.000% | 500,000 | 50,00,0000 | 0.14% | 99.9% | 100.1% | 49,930,704 | 50,069,296 |
| 100,000,000 | 1,000,000 | 33.000% | 330,000 | 33,000,000 | 0.23% | 99.8% | 100.2% | 32,924,562 | 33,075,438 |
| 100,000,000 | 1,000,000 | 10.000% | 100,000 | 10,000,000 | 0.56% | 99.4% | 100.6% | 9,944,217 | 10,055,783 |
| 100,000,000 | 1,000,000 | 1.000% | 10,000 | 1,000,000 | 1.94% | 98.1% | 101.9% | 980,596 | 1,019,404 |
| 100,000,000 | 1,000,000 | 0.100% | 1,000 | 100,000 | 6.19% | 93.8% | 106.2% | 93,808 | 106,192 |
| 100,000,000 | 1,000,000 | 0.010% | 100 | 10,000 | 19.60% | 80.4% | 119.6% | 8,040 | 11,960 |
| 100,000,000 | 1,000,000 | 0.001% | 10 | 1,000 | 61.98% | 38.0% | 162.0% | 380 | 1,620 |

Client applications, such as Visual Site, depict the accuracy level of the data that is displayed in visualizations by showing a confidence interval through making the value in the display "fuzzy" or diluted in color, in proportion to the potential for error in the inference made by a selection of the random sample.

It is clear from the example above that the data inferred by client applications, such as Visual Site, is very highly accurate with larger selections and becomes less accurate and the depictions of the data become more fuzzy as the user's selected part of the sample (X) becomes very small. In other words, client applications, such as Visual Site, are highly accurate until the selection sizes become less than 1% of the sample. A major exception to this lies in the fact that client applications can be configured to create large samples of smaller parts of the full population of data to allow for analysis at very high accuracy levels for smaller populations of visitors, though this is not the default configuration.

It is important to understand that inaccuracies introduced by other factors into the collection of the entire population of data my any known means make it unclear as to whether inaccuracies introduced by random sampling are not outweighed by others that would be experienced in doing lengthy queries of all of the fact data, or are already existent due to data collection process limitations. Clearly, applications such as Visual Site are not designed to replace a relational database that helps you get detailed information about individual users in your visitor population, support your transactional systems, or replace your accounting system for the tracking or revenue and expenditure. These applications, such as Visual Site, are built to allow you to analyze your customers, campaigns, business process and system performance over time and other dimensions so that you may observe patterns, trends, and changes that help you optimize your profitability and your return on investment. The sampling technology of the present invention allows users to rapidly query the equivalent otherwise unapproachably vast amounts of data in just milliseconds. Other significant factors also contribute to VOLAP's ability to visually explore data so rapidly.

Incremental sampling is accomplished in the present example embodiment according to the following description. Given:
- a sequence of visitor ID values v(i)
- a desired sample size "size"
- a hash function "H", such that 0<=H(v)<1
- a function "distinct", such that distinct(x)=the number of distinct v(i) where i<=x.

The algorithm:
for i in range(1, infinity):
  if H(v(i))<size/distinct(i) and v(i) never in sample:
    add v(i) to sample.

(1) This produces a random sample of v, assuming there are no duplicates in v

After j values have been processed, the probability that item v(i) is in the sample (i<=j) is given by size/distinct (j)=size/j (if v has no duplicates, then clearly distinct(x)=x).

This is proved by induction on j.

When j=i, item v(i) was just added to the sample with probability size/j, so it is in the sample with probability size/j by definition.

If at time j−1 v(i) was in the sample with probability size/(j−1), then at time j:
With probability A=1−size/(j−1), v(i) was not in the sample before, and is still not in the sample.
With probability B=(size/(j−1))*(size/j)*(1/size), v(i) was in the sample before, and was just evicted.

Otherwise, v(i) is in the sample at time j. This has probability $$1 - (A + B) = 1 - (1 - size/(j-1) + (size/(j-1)) * (size/j) * (1/size)))$$

$$= size/(j-1) - (size/(j-1)) * (size/j) * (1/size)$$

$$= size/(j-1) - size/(j-1)/j$$

$$= (j * size - size)/j/(j-1)$$

$$= size * (j-1)/j(j-1)$$

$$= size/j$$

QED (2) Duplicates in the v(i) list have no effect

Given a v list with duplicates, find the first pair i and j such that v(i)=v(j) and i<j. By removing v(j) from the list, a list v' is constructed that contains one less duplicate pair. This shows that the algorithm produces the same results on v and on v'; by induction it produces the same results on a list v" that contains no duplicates.

Either v(i) is added to the sample or it is not. In either case, it shows that v(j) is not added to the sample, since in v' v(j) is not present and therefore cannot be added to the sample.

If v(i) is added to the sample, then by definition "v(i) never in sample" is false, and since v(i)=v(j) "v(j) never in sample" is false. Therefore v(j) is not added to the sample.

If v(i) is not added to the sample, then H(v(i))<size/distinct (i). Since i<j, distinct(i)<=distinct(j). Therefore:
H(v(j))=H(v(i))<size/distinct(i)<=size/distinct(j)
H(v(j))<size/distinct(j)
and therefore v(j) is not added to the sample.

(3) For a sequence of v(i) with no duplicates:
distinct(x)=x
v(i) never in sample=true Optionally, H(v(i))=FRAND( ). Since each v(i) is only seen once, random numbers and hash functions are indistinguishable. Be careful not to use float(rand( ))/RAND_MAX, since RAND_MAX is too low for adequate precision.

The database is periodically saved as a backup precaution. The time between saves is configurable in the configuration file.

3. Transactions

The sampling process of the Visual Server generates a queue of transactions composed of a transaction for each discrete change that it intends to make. A list of the currently defined transactions is:

| | |
|---|---|
| InsertVisitorTrans | Adds a new visitor to the sample database |
| InsertReferrerTrans | Adds a new referrer to the referrer dimension |
| InsertSessionTrans | Adds a new session to a visitor's clickstream in the database |
| InsertPageTrans | Adds a new page to the page dimension |
| InsertClickTrans | Adds a new click to a session |
| DeleteVisitorTrans | Removes a visitor from the sample (so that it can be replaced) |
| UpdateTotalSeenTrans | Special transaction - see VSTP discussion below. |
| DatabaseSnapshotTrans | Special transaction - see VSTP discussion below. |

As a transaction is generated by the processTransaction( ) function, the transaction is placed on the end of a circular transaction log, which then executes the transaction against the server database. The same transactions are requested by all Visual Workstations connected to that visual server once they have been created, this serves to keep the database on the server and the database on each of the clients synchronized.

The circular transaction log is the log of transactions that are being created by Visual Server for insertion into the database on Visual Server and the databases that are auto-distributed and updated wherever Visual Workstation is installed. The transaction queue is the queue of Web Server transaction information or "log data" that is queued up for secure transit to the Visual Workstation.

The size of this log is also configurable in the configuration file. The processing server builds up its database by executing these transactions. The transaction log works in conjunction with the Visual Server Transmission Protocol (VSTP) to synch up Visual Workstation databases. The special transaction UpdateTotalSeenTrans is placed in the log periodically to inform the workstation of the total number of visitors seen so far by the sampling process. This transaction is never executed on the server side, only on the workstation. The DatabaseSnapshotTrans is never placed in the log nor executed on the server side. Instead it is generated in special circumstances (see VSTP discussion below) on the server, transmitted to the workstation, and executed there.

4. Visual Sciences Transmission Protocol (VSTP) and the Transaction Log

Visual Workstation connects to port 443 on Visual Server as if the Visual Server was a web server running HTTPS. A connection is maintained and reconstructed if lost. Visual Server uses the connection to push incremental updates from its database to the database on Visual Workstation. Visual Server continues to push these updates incrementally until the databases are synchronized. If a Visual Workstation is disconnected for a period of time and then reconnected to the network, Visual Server will begin sending all updates since the time when Visual Workstation was connected to the Visual Workstation upon reconnection. Data being send to Visual Workstation is represented in a binary format that provides a first level of data security. The connection between Visual Workstation and Visual Server is also encrypted using SSL.

When an application (e.g., Visual Site) running on a Visual Workstation connects via HTTP/SSL to the processing server, the application transmits a database identifier and a pointer into the transaction log. If it is the first time the application is run, then it sends a pair of zeros. The Visual Server checks that the database identifier to determine if the transmitted database identifier identifies the database on the Visual Server. If the transmitted database identifier does not correspond to the database present on the Visual Server, then the Visual Server treats the situation as if it were the first time the application were run.

If the transaction log has wrapped, causing the pointer to be invalid, a DatabaseSnapshotTrans transaction is generated, and transmitted back to the application. The application then executes the transaction, giving it a snapshot of the database at the time it was taken and updating the transaction log pointer.

When a valid transaction pointer is sent to the Visual Sever, the transactions in the transaction log up to that pointer are sent to the application every X milliseconds. The value of X is configurable in the configuration file. As each transaction is executed, it gets closer and closer to matching the database on the server, until it is running in real time, at which point transactions come in as they are generated on the server.

In certain cases, the whole database is sent to the client again as a single transaction to refresh the client database, this is generally done when something structurally significant is done to change the server database.

The following are sample contents of an a configuration file (config.vsc):

```
SampleSize=200000
TLogSize=40000000
BackupDelay=240000
TransmissionDelay=1000
SiteList=everbank.com,mids.com
WorkingDirectory=d:\Visual Sciences\ETL\Logs
SequenceMask=-24.168.212.55.log
SequenceMask=-24.168.212.57.log
```

C. Visual Workstation/Applications

Visual Site is an example application that runs on the Visual Workstation and that is focused on providing business value from the data that can be collected about customers, campaigns, and business processes that exist on the Internet. For large sites the amounts of data can be larger than almost any other set that is routinely collected in the business world, for instance if a site is receiving 100 million visits a day and each visitor makes an average of 10 clicks on URLs in a visit, then 1 billion transactions would be logged each representing approximately 300 Bytes of data each or 300 Gigabytes of data per day or approximately 110 Terabytes (109,500,000,000,000) of data in a year. Because Visual Site as an application is focused in the domain of web transaction data, the above discussed statistical sampling is the only cost-effective way to analyze such vast quantities of data and still present that data to the user in sub-second response times. Today a system does not exist that could process the entire 110 Terabytes of data to analyze one year interactively at sub-millisecond query response times.

However, many application areas that the VOLAP technology are suitable for may not have enough data to warrant or require random statistical sampling to be used by VOLAP to provide the application and maintain sub-second data access performance.

VOLAP does not use cubes, aggregations or multi-dimensional arrays in the same way that they are used by "cube or aggregation vendors." "Cube or aggregation" vendors have relatively longer-term processes that aggregate data into multi-dimensional arrays and then queries are performed against those arrays. VOLAP technology allows very fast access to its database and allows the rapid location of data in that database. The data that VOLAP queries each time is the fact data, not an aggregation of the data into multi-dimensional arrays that needed to be prepared in advance. VOLAP's tremendously fast data access abilities allow it to create multi-dimensional arrays and multiple other types of data structures on-the-fly in milliseconds if they are needed for a particular type of analysis.

A VOLAP Application implies the following:

1. The work has already been done to get data from primary systems that relate to the application (web servers in this case) into a data model for the applications, into the VOLAP technology platform and generally available for application functionality to use in serving information to the user of Visual Workstation;

2. Interactive visualizations have been developed to illustrate the dynamics of the data to the user;

3. Types of analysis functionality, including inference models, have been added to the Visual Workstation to help the user evaluate their options and optimize their business value; and 4. Workspaces and dashboards have been customized that tailor the user interface of the application to the particular needs and tasks of its users.

D. Visual Site

Visual Site is designed to allow its users to recognize trends, correlations, and gain insights into the dynamics of their business processes, marketing campaigns, customer relationships and system performance over time. Visual Site uses advanced statistical methods to allow its users to search the vast amounts of data collected by their servers in milliseconds, fast enough to allow for visualizations that represent tens of thousands of data values, in ways that can be easily understood and rendered in real-time when user's select the data that they want to view through Visual Workstation's advanced interactive graphical query building interface.

Visual Site is best defined as the application that runs on the set of data that includes that collected from Web servers and related applications and databases, but is oriented around Visitor Sessions to such systems. A number of specific visualizations have been defined for Visual Site such as 3D Site Map, which shows visitor traffic across the pages in a web site and shows the conversion, retention or duration metrics across those pages.

Visual Site supports a number of primary metrics including:
1. Visits—Visitor Sessions;
2. Conversion—The rate at which a user at point X converts to point Y that has business value to a site (such as a purchase);
3. Value—The value of N events completed by the selected customers on a site;
4. Exits—The points at which customers leave the site;
5. Exit Value—The cost of the loss of a customer at a certain point in the site based on what others who had made it to that point created in terms of value in the remainder of their sessions;
6. Duration—The amount of time that a customer session persists; and
7. Retention—The rate at which a customer returns to the site.

Visual Site supports a number of dimensions
1. Time—Can view metrics over all types of time dimensions: Day, Week, Month, etc.;
2. Referrers—Can view metrics over by referrer;
3. Page—Can view at metrics by page Additional applications can be written to run on Visual Workstation. These applications would look at other types of data.

The systems, processes, and components set forth in the present description may be implemented using one or more general purpose computers, microprocessors, or the like programmed according to the teachings of the present specification, as will be appreciated by those skilled in the relevant art(s). Appropriate software coding can readily be prepared by skilled programmers based on the teachings of the present disclosure, as will be apparent to those skilled in the relevant art(s). The present invention thus also includes a computer-based product which may be hosted on a storage medium and include instructions that can be used to program a computer to perform a process in accordance with the present invention. The storage medium can include, but is not limited to, any type of disk including a floppy disk, optical disk, CDROM, magneto-optical disk, ROMs, RAMs, EPROMs, EEPROMs, flash memory, magnetic or optical cards, or any type of media suitable for storing electronic instructions, either locally or remotely.

The foregoing has described the principles, embodiments, and modes of operation of the present invention. However, the invention should not be construed as being limited to the particular embodiments described above, as they should be regarded as being illustrative and not as restrictive. It should be appreciated that variations may be made in those embodiments by those skilled in the art without departing from the scope of the present invention.

While a preferred embodiment of the present invention has been described above, it should be understood that it has been presented by way of example only, and not limitation. Thus, the breadth and scope of the present invention should not be limited by the above described exemplary embodiment.

Obviously, numerous modifications and variations of the present invention are possible in light of the above teachings. It is therefore to be understood that the invention may be practiced otherwise than as specifically described herein.

The invention claimed is:

1. A method comprising:
generating, by a computer processor, a first node metric for a first node representing a first page of a network content site and a second node metric for a second node representing a second page of the network content site, wherein each of the first and second node metrics describes a degree of user interaction with a respective one of the first and second nodes during visits to the network content site;
generating, by the computer processor, a link metric describing a number of the visits involving navigation from the first node to the second node;
generating, by the computer processor, a site map interface based on the first node metric, the second node metric, and the link metric, the site map interface comprising:
a first visual representation for the first node,
a second visual representation for the second node, and
a linking visual representation extending from the first visual representation to the second visual representation in the site map interface,
wherein respective visible characteristics of the first visual representation, the second visual representation, and the linking visual representation indicate respective values for the first node metric, the second node metric, and the link metric; and
rendering, by the computer processor, the site map interface for display.

2. The method of claim 1, wherein the degree of user interaction with the respective one of the first and second nodes comprises a number of sessions in which the respective node was accessed.

3. The method of claim 1, wherein the degree of user interaction with the respective one of the first and second nodes comprises a number of sessions in which the node was involved in a revenue generating event.

4. The method of claim 3, wherein generating the site map interface comprises selecting a color for the first and second visual representations indicative of the first and second nodes being involved in the revenue generating event.

5. The method of claim 1, wherein the site map interface comprises a two-dimensional interface and wherein the respective visible characteristics of the first and second visual representations comprise respective two-dimensional areas occupied by the first and second visual representations, wherein each two-dimensional area is proportional to a respective value for a node metric.

6. The method of claim 5, wherein the visible characteristic of the linking visual representation comprises a width of a line segment extending from the first visual representation to the second visual representation, wherein the width is proportional to a value of the link metric.

7. The method of claim 1, wherein the site map interface comprises a three-dimensional interface and wherein the respective visible characteristics of the first and second visual representations comprise respective heights of the first and second visual representations with respect to a two-dimensional plane in the three-dimensional interface, wherein each height is proportional to a respective value for each of the first node metric and the second node metric.

8. The method of claim 7, wherein the visible characteristic of the linking visual representation comprises a cross-sectional area of a three-dimensional object extending from the first visual representation to the second visual representation, wherein the cross-sectional area is proportional to a value of the link metric.

9. A system comprising:
a processor; and
a non-transitory computer-readable medium interfaced with the processor, the non-transitory computer-readable medium storing program instructions;
wherein the processor is configured to execute the program instructions to perform operations comprising:
generating a first node metric for a first node representing a first page of a network content site and a second node metric for a second node representing a second page of the network content site, wherein each of the first and second node metrics describes a degree of user interaction with a respective one of the first and second nodes during visits to the network content site,
generating a link metric describing a number of the visits involving navigation from the first node to the second node,
generating a site map interface based on the first node metric, the second node metric, and the link metric, the site map interface comprising:
a first visual representation for the first node,
a second visual representation for the second node, and
a linking visual representation extending from the first visual representation to the second visual representation in the site map interface,
wherein respective visible characteristics of the first visual representation, the second visual representation, and the linking visual representation indicate respective values for the first node metric, the second node metric, and the link metric, and
rendering the site map interface for display.

10. The system of claim 9, wherein the degree of user interaction with the respective one of the first and second nodes comprises a number of sessions in which the respective node was accessed.

11. The system of claim 9, wherein the degree of user interaction with the respective one of the first and second nodes comprises a number of sessions in which the node was involved in a revenue generating event.

12. The system of claim 11, wherein generating the site map interface comprises selecting a color for the first and second visual representations indicative of the first and second nodes being involved in the revenue generating event.

13. The system of claim 9, wherein the site map interface comprises a two-dimensional interface and wherein the respective visible characteristics of the first and second visual representations comprise respective two-dimensional areas occupied by the first and second visual representations, wherein each two-dimensional area is proportional to a respective value for a node metric.

14. The system of claim 13, wherein the visible characteristic of the linking visual representation comprises a width of a line segment extending from the first visual representation to the second visual representation, wherein the width is proportional to a value of the link metric.

15. The system of claim 9, wherein the site map interface comprises a three-dimensional interface and wherein the respective visible characteristics of the first and second visual representations comprise respective heights of the first and second visual representations with respect to a two-dimensional plane in the three-dimensional interface, wherein each height is proportional to a respective value for each of the first node metric and the second node metric.

16. A non-transitory computer-readable medium storing program code computer-executable on a computer system, the program code comprising:
program code for generating a first node metric for a first node representing a first page of a network content site and a second node metric for a second node representing a second page of the network content site, wherein each of the first and second node metrics describes a degree of user interaction with a respective one of the first and second nodes during visits to the network content site;
program code for generating a link metric describing a number of the visits involving navigation from the first node to the second node;
program code for generating a site map interface based on the first node metric, the second node metric, and the link metric, the site map interface comprising:
a first visual representation for the first node,
a second visual representation for the second node, and
a linking visual representation extending from the first visual representation to the second visual representation in the site map interface,
wherein respective visible characteristics of the first visual representation, the second visual representation, and the linking visual representation indicate respective values for the first node metric, the second node metric, and the link metric; and
program code for rendering the site map interface for display.

17. The non-transitory computer-readable medium of claim 16, wherein the degree of user interaction with the respective one of the first and second nodes comprises a number of sessions in which the respective node was accessed.

18. The non-transitory computer-readable medium of claim 16, wherein the degree of user interaction with the respective one of the first and second nodes comprises a number of sessions in which the node was involved in a revenue generating event.

19. The non-transitory computer-readable medium of claim 16, wherein the site map interface comprises a two-dimensional interface and wherein the respective visible characteristics of the first and second visual representations comprise respective two-dimensional areas occupied by the first and second visual representations, wherein each two-dimensional area is proportional to a respective value for a node metric.

20. The non-transitory computer-readable medium of claim 16, wherein the site map interface comprises a three-dimensional interface and wherein the respective visible characteristics of the first and second visual representations comprise respective heights of the first and second visual representations with respect to a two-dimensional plane in the three-dimensional interface, wherein each height is proportional to a respective value for each of the first node metric and the second node metric.

* * * * *